United States Patent [19]
Katsura et al.

[11] Patent Number: 5,790,900
[45] Date of Patent: Aug. 4, 1998

[54] PHOTO FILM, PHOTO FILM ADVANCING DEVICE AND LENS-FITTED PHOTO FILM UNIT FOR USE WITH THE SAME

[75] Inventors: Hirofumi Katsura; Kazuo Kamata, both of Kanagawa, Japan

[73] Assignee: Fuji Photo Film Co., Ltd., Kanagawa, Japan

[21] Appl. No.: 588,122

[22] Filed: Jan. 18, 1996

[30] Foreign Application Priority Data

| | | | |
|---|---|---|---|
| Jan. 23, 1995 | [JP] | Japan | 7-008166 |
| Mar. 9, 1995 | [JP] | Japan | 7-050095 |
| May 25, 1995 | [JP] | Japan | 7-126301 |
| Aug. 10, 1995 | [JP] | Japan | 7-204286 |

[51] Int. Cl.$^6$ .................................. G03B 1/00
[52] U.S. Cl. ............... 396/6; 396/395; 396/399; 396/401; 396/411
[58] Field of Search .................... 354/203, 204, 354/205, 206, 207; 430/501; 396/6, 387, 395, 399, 401, 411, 440, 430

[56] References Cited

U.S. PATENT DOCUMENTS

| | | | |
|---|---|---|---|
| 3,682,066 | 8/1972 | Simon | 354/204 |
| 5,471,265 | 11/1995 | Shibata et al. | 354/76 |
| 5,521,669 | 5/1996 | Kamata | 354/204 |
| 5,539,484 | 7/1996 | Wakabayashi | 354/207 |
| 5,548,364 | 8/1996 | Muramatsu et al. | 354/204 |

FOREIGN PATENT DOCUMENTS 6-82955  3/1994  Japan .

*Primary Examiner*—Eddie C. Lee
*Attorney, Agent, or Firm*—Young & Thompson

[57] ABSTRACT

Photo film has pairs of perforations arranged at a regular pitch (L1+L2) along at least one edge thereof. Each of the pairs of perforations includes first and second perforations arranged at a small regular interval (L1) away from one another. A photo film advancing device has a rotatable sprocket wheel (41, 72, 80, 152, 252), a periphery of which has at least one pair of teeth, respectively including first and second teeth disposed away from one another nearly at the regular interval. The first tooth is engaged with the first perforation. The second tooth is engaged with the second perforation. A retaining member (44) causes the sprocket wheel to have a locked state, and disables the photo film from advancing when the second perforation is engaged with the second tooth. The retaining member causes the sprocket wheel to have an unlocked state and enables the sprocket wheel to rotate when a shutter operates. A plate spring (45) is associated with the sprocket wheel, and operates after the sprocket wheel is rotated as much as a small amount by advancement of the photo film while the sprocket wheel has the unlocked state. The plate spring rotates the sprocket wheel further as much as a predetermined amount in the same direction when the second tooth is moved away from the second perforation, so as to cause the first tooth to stand by for engaging with a succeeding pair of the pairs of perforations with the first tooth in contact with the photo film. The photo film is advanced in contact with the first tooth.

28 Claims, 19 Drawing Sheets

F I G. 1
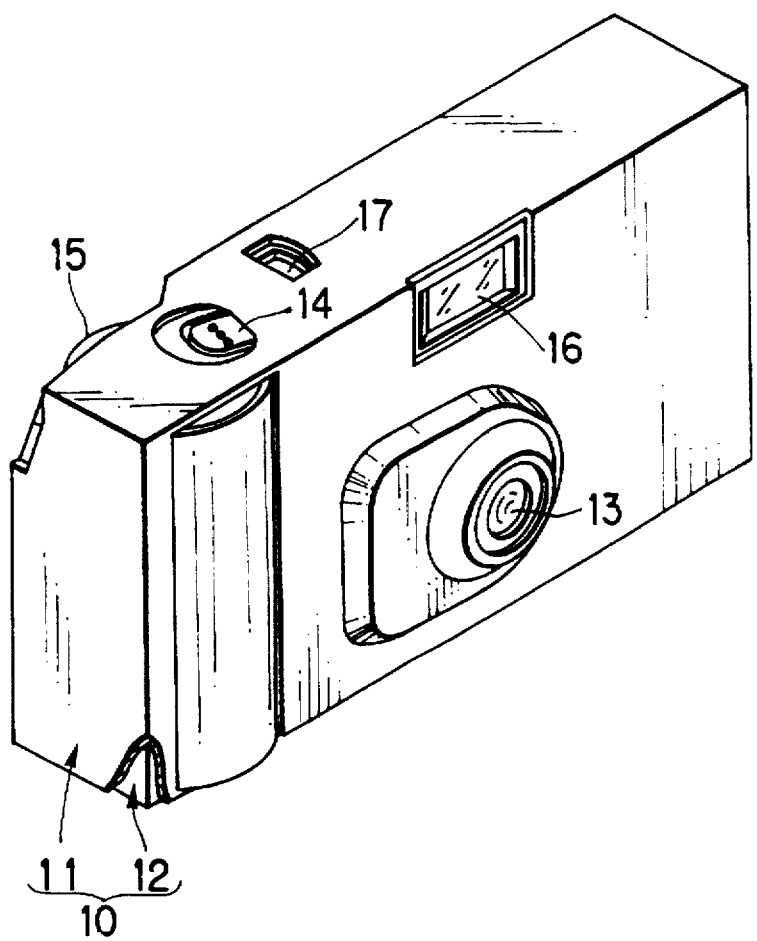

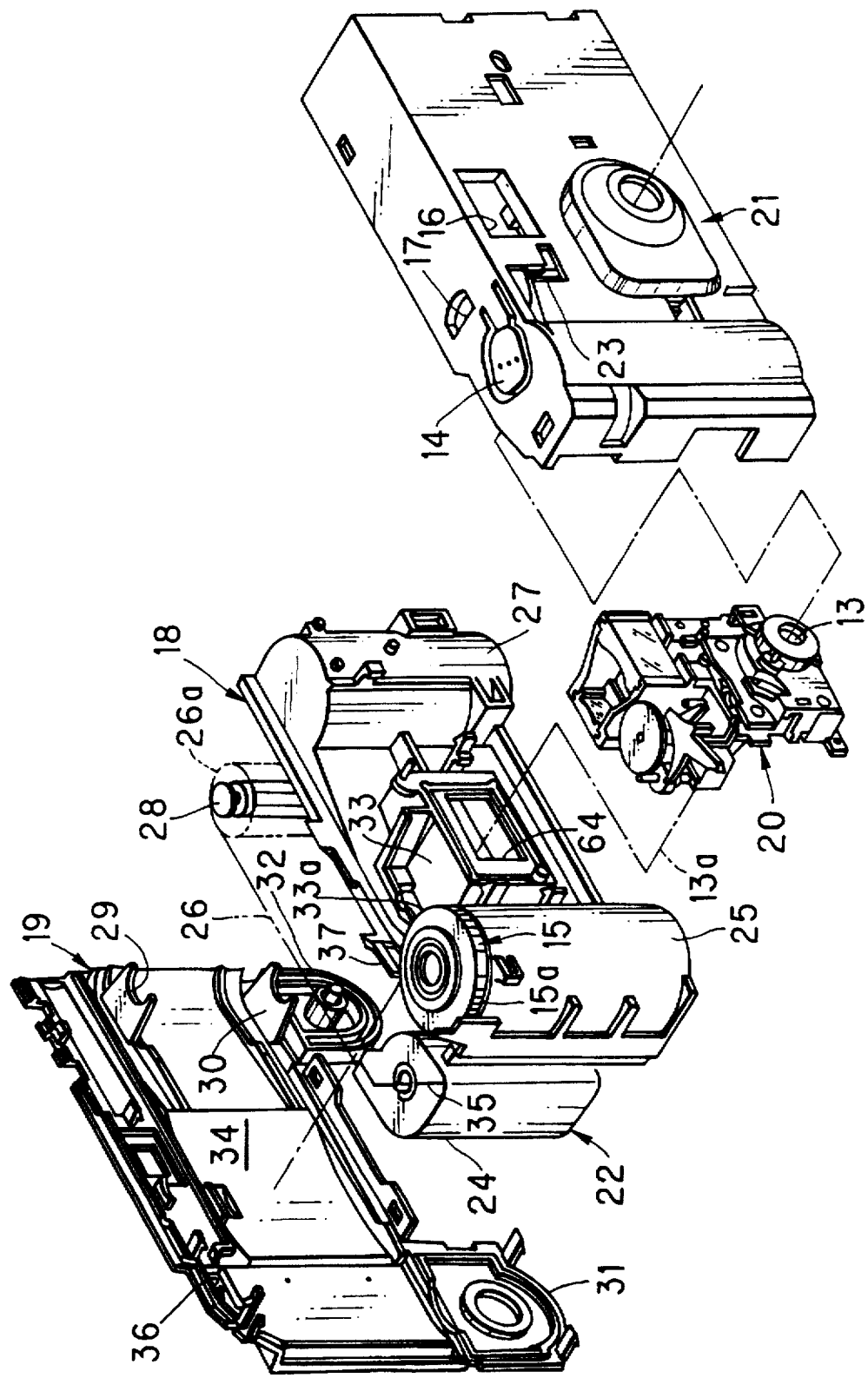
F I G. 2

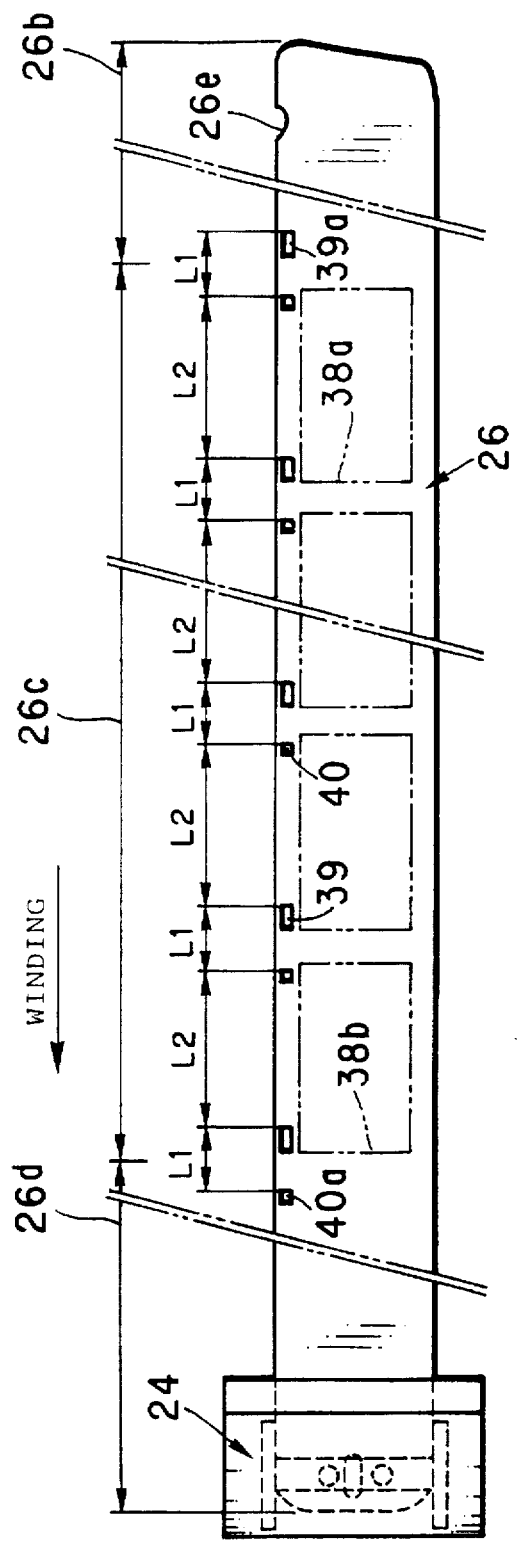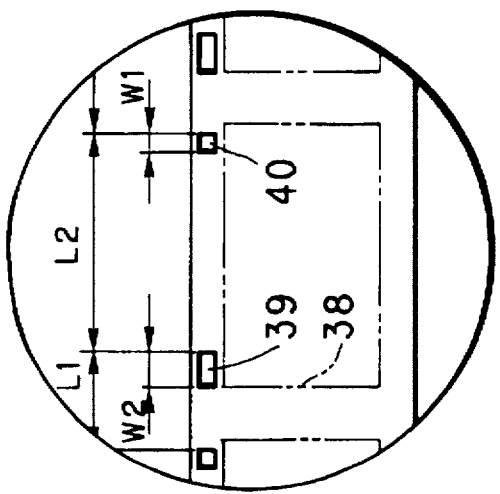

F I G. 7
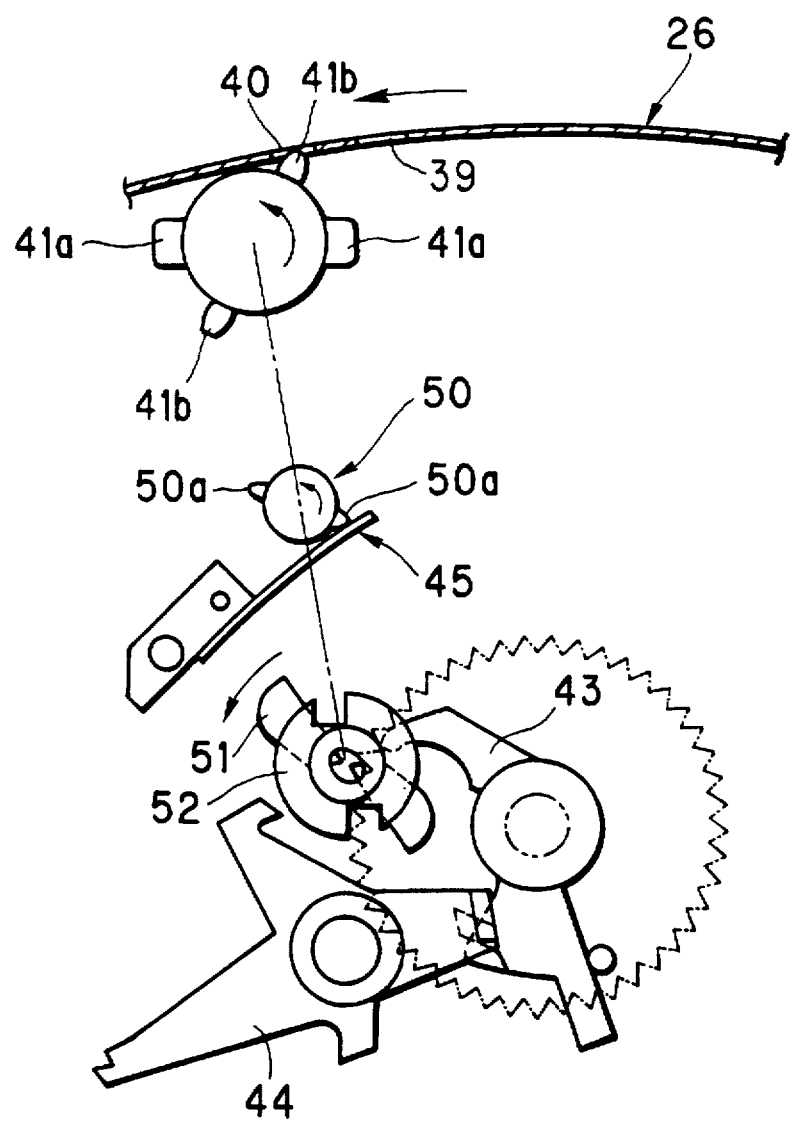

F I G. 9
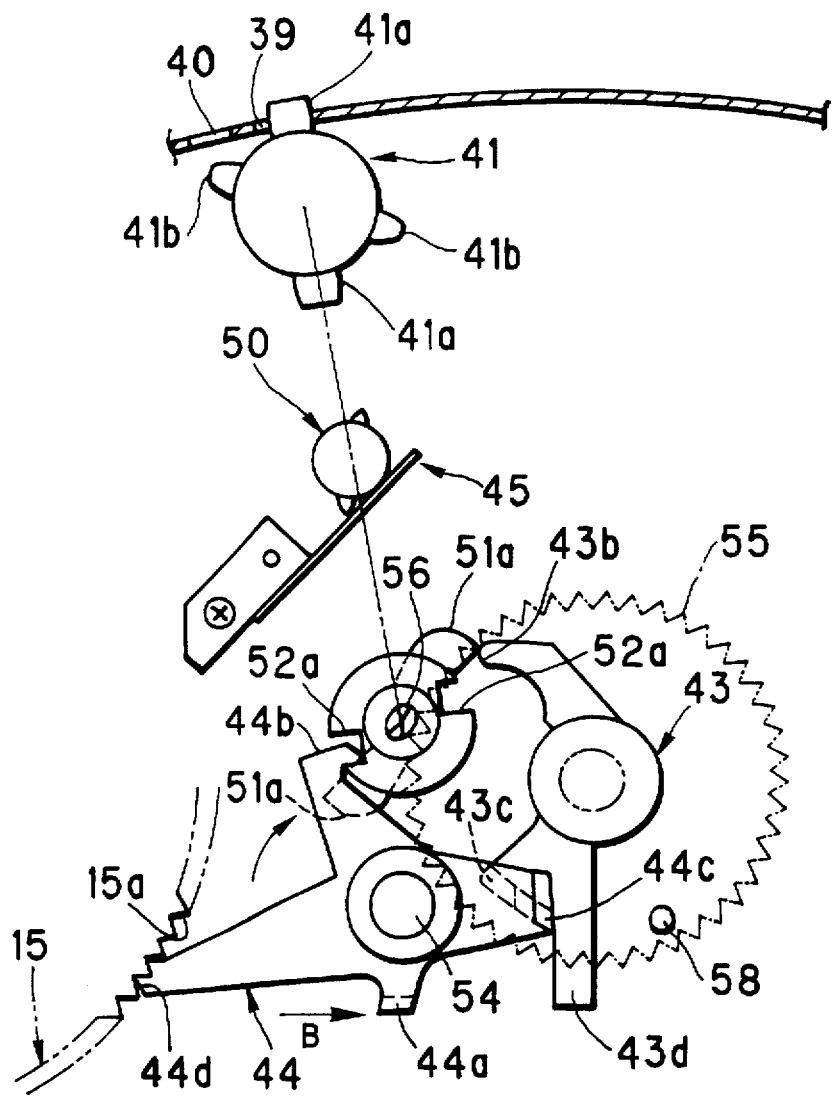

F I G. 18
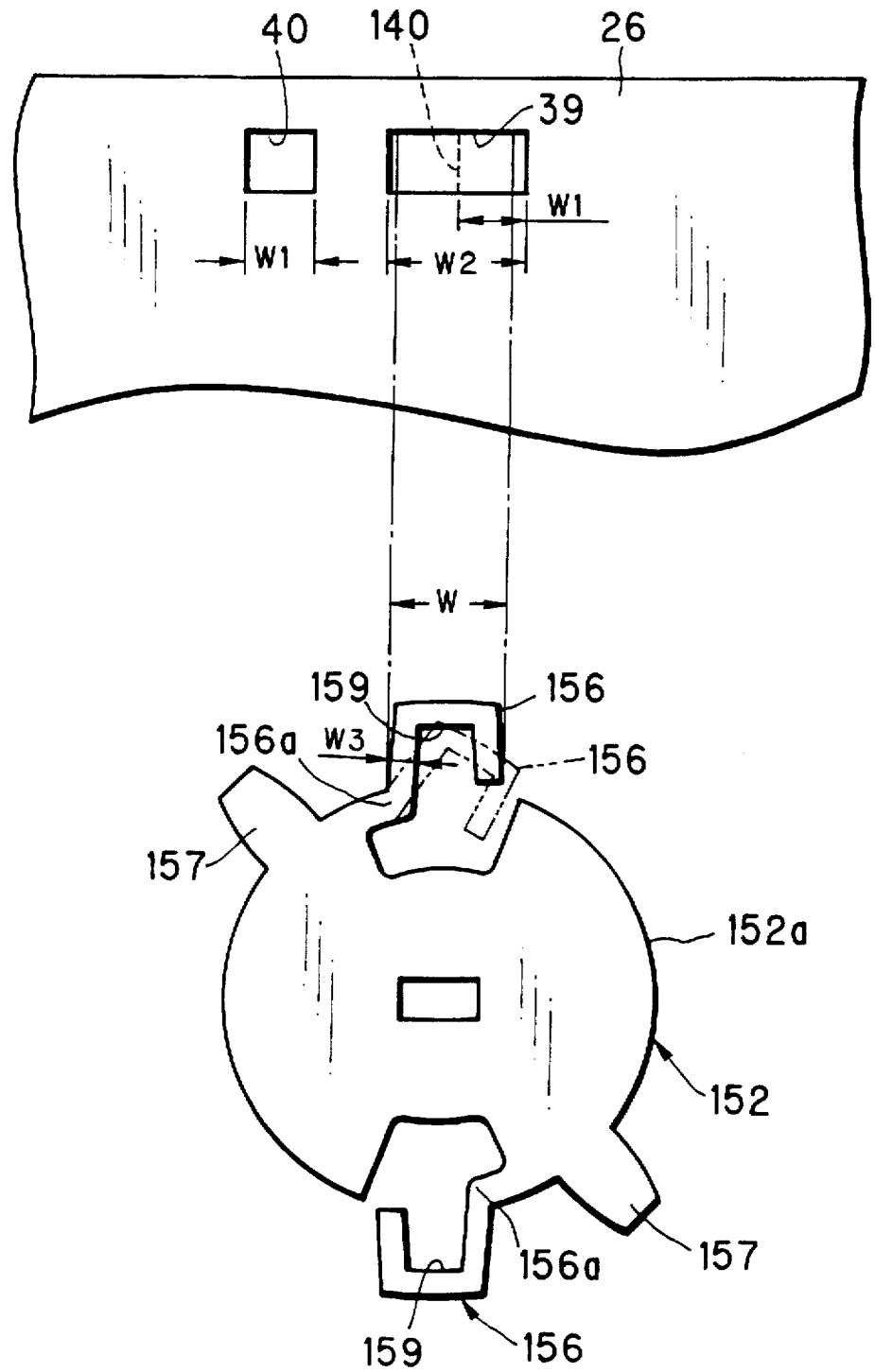

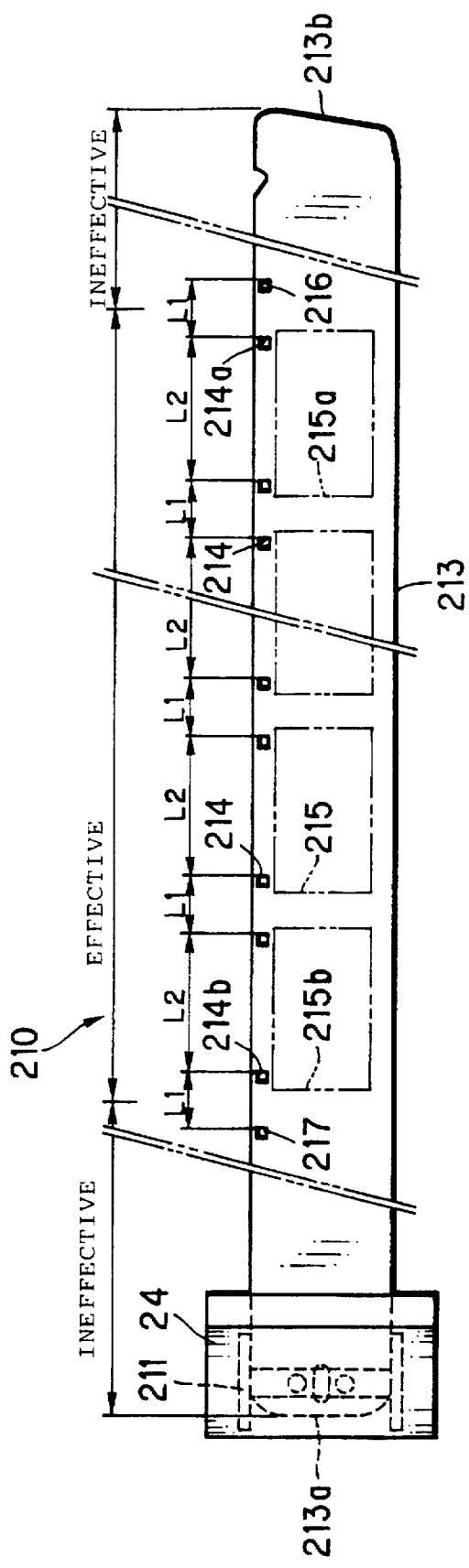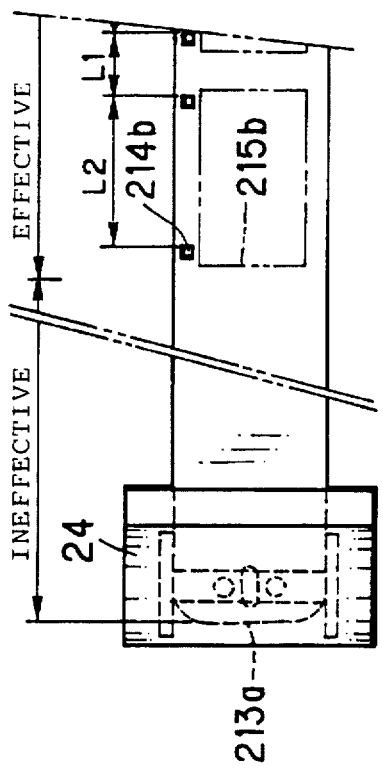

PHOTO FILM, PHOTO FILM ADVANCING DEVICE AND LENS-FITTED PHOTO FILM UNIT FOR USE WITH THE SAME

BACKGROUND OF THE INVENTION

1. Field of the Invention

The present invention relates to a photo film, a photo film advancing device and a lens-fitted photo film unit for use with the same. More particularly, the present invention relates to a photo film in which each of frames is associated with at least one perforation regularly, a photo film advancing device for advancing the same, and a lens-fitted photo film unit containing the photo film and incorporating the photo film advancing device.

2. Description Related to the Prior Art

There is a lens-fitted photo film unit, which is preloaded with unexposed photo film and a cassette, and is sold by the present assignee, for example with a trade name "Quick Snap Super 800".

The lens-fitted photo film unit, known so far, incorporates a taking lens, a photo film winding mechanism, a shutter mechanism, and a drive mechanism both for one-frame winding of the photo film and for driving the shutter mechanism. There are formed a cassette containing chamber and a photo film roll chamber between which an exposure aperture is located. The cassette containing chamber contains the cassette. The roll chamber contains a roll of the unexposed photo film as drawn fully from the cassette. Perforations are formed in the photo film at a regular pitch.

The photo film winding mechanism includes a winding wheel and a transmission portion. The winding wheel partially emerges to the outside and is rotatable over the cassette containing chamber. The transmission portion transmits rotation of the winding wheel to a spool of the cassette inside the cassette containing chamber. When the winding wheel is operated to rotate, the photo film after exposure is pulled into the cassette.

The drive mechanism includes a member for stopping rotation of a driven sprocket wheel, and a retaining member for stopping rotation of the winding wheel upon movement of the photo film as long as one frame. The retaining member is disposed near to the cassette containing chamber for facilitating retention of the winding wheel. The sprocket wheel is engaged with the perforations in a position between the cassette containing chamber and the center of the exposure frame. In the stop of the sprocket wheel, teeth of the sprocket wheel remain engaged with the perforations, to avoid moving the photo film during exposures.

The shutter mechanism includes a shutter blade, which a spring biases in a direction away from a charge position. For the shutter charging, the sprocket wheel, in mesh with the perforations, is rotated by force reverse to and greater than the bias of the spring of the shutter blade. During the one-frame feeding of the film, the shutter is charged by rotation of the sprocket wheel via the drive mechanism.

The lens-fitted photo film unit is shipped out of a factory with the shutter mechanism kept uncharged, to avoid the shutter releasing even with vibration or shock in transportation. A user having purchased the photo film unit manually rotates the winding wheel at first, to charge the shutter mechanism. A frame the nearest to a trailer of the photo film is set on the exposure aperture. Then exposures are taken from the trailer toward a leader. After a frame the nearest to the leader is exposed, the photo film is wound fully, to include the photo film in the cassette.

A photo film advancing device inclusive of the winding wheel and incorporated in the photo film unit, known so far, advances the photo film, which is of a 135 type defined in the international standards (for example ISO). The sprocket wheel, which has eight teeth, is engaged with the perforations at a regular pitch. Upon movement of the film as much as eight perforations, the sprocket wheel makes one rotation, and immediately the winding wheel is stopped from rotating, to stop the photo film. In the course of the film feeding, the shutter mechanism is charged against the spring via the sprocket wheel. This structure for the one-frame feeding is advantageous in low cost, as compared with another including a photo sensor which monitors passage of the perforations for the stop of the film.

U.S. Pat. No. 5,471,265 (corresponding to JP-A (Japanese Patent Laid-open Publication No.) 5-19368) discloses a photo film in which each of frames is associated with two perforations. One of the two is associated with an edge of the frame nearer to the leader. The other of the two is associated with an edge of the frame nearer to the trailer. Each frame is created between positions of the two perforations. The perforations are arranged at two intervals which are alternately repeated. The longer of the two intervals is related with a length of each frame. The shorter of the two intervals is related with an interval between adjacent two of the frames.

To detect the one-frame feeding of the photo film of this type, it is conceivable to monitor passage of the perforations through a photo sensor for stop of the photo film. One of every two of the perforations may be detected photoelectrically. Otherwise each pair of the perforations may be detected photoelectrically. However such techniques are unsuitable for a compact camera of a low-cost type, because circuits for amplifying and rectifying a photoelectric signal from the photo sensor need be added in complicated fashion as well as the photo sensor.

It is also conceivable to use a detector claw used in a 110 camera of a simple type. The detector claw may be biased by a spring, and mechanically shifted to move into each perforation. When the detector claw enters a perforation at an edge of each frame nearer to the trailer, one-frame feeding of the photo film can be detected. This can be detected also upon movement as far as a regular length after entry of the detector claw into a perforation. However a shortcoming lies in that a mechanism is inevitably required for removing the detector claw from the perforations. With such a removing mechanism, excessively complicated linkages are likely to operate erroneously. Another disadvantage lies in efficient use of an inside space, because the claw must be moved perpendicularly to the movement of the photo film.

Today public concern is shown on withdrawing and reusing plurality of the photo film units as used, in view of effective use of resources, by use of insertion of a new photo film. However, simple reloading of a photo film and a cassette into a used photo film unit cannot acquire desired performance with inevitable degradation of the mechanisms, and is likely to scratch the photo film. To overcome such difficulties, photo film units as withdrawn are subjected to inspecting apparatuses, where their parts are inspected for performance of various specifics, and cleaned. It is necessary to avoid reloading photo film units with photo films without care. There are various proposals of avoidance of reloading. However their shortcomings still remain: photo film units are likely to be broken to a degree unusable forever; numbers of parts and steps of reassembly are likely to be much greater.

SUMMARY OF THE INVENTION

In view of the foregoing problems, an object of the present invention is to provide a photo film advancing device of which a simple structure can effect the one-frame feeding of photo film in which each of frames is associated with at least one perforation regularly.

Another object of the present invention is to provide a lens-fitted photo film unit in which reloading thereof with a photo film without care can be avoided.

In order to achieve the above and other objects and advantages of this invention, a photo film advancing device advances photo film as much as a regular pitch at which frames are formable on the photo film. A pattern of perforations is formed in the photo film and arranged along at least one edge thereof. The pattern includes perforations of which at least one perforation is associated with each of the frames. The photo film advancing device includes a rotatable sprocket wheel having at least one tooth engaged with the one perforation while the photo film is advanced. A retaining mechanism causes the sprocket wheel to have a locked state and for disabling the photo film from advancing when the one perforation is engaged with the tooth. The retaining mechanism causes the sprocket wheel to have an unlocked state and enables the sprocket wheel to rotate when a shutter operates. A bias member is associated with the sprocket wheel, for operating after the sprocket wheel is rotated in a driven direction as much as a small amount by advancement of the photo film while the sprocket wheel has the unlocked state. The bias member rotates the sprocket wheel further in the driven direction when the tooth is moved away from the one perforation, so as to cause the tooth to stand by for engaging with a second one of the perforations succeeding the one perforation with the tooth in contact with the photo film. While the tooth stands by, the photo film is advanced in contact with the tooth.

A photo film advancing device advances photo film as much as a regular pitch at which frames are formable on the photo film. Pairs of perforations are formed in the photo film and arranged at the regular pitch along at least one edge thereof. Each of the pairs of perforations includes first and second perforations arranged at a small regular interval away from one another. The photo film advancing device has a rotatable sprocket wheel. At least one pair of teeth is disposed on a periphery of the sprocket wheel. Each of the at least one pair of teeth includes first and second teeth disposed away from one another in association with the regular interval. The first tooth is engaged with the first perforation. The second tooth is engaged with the second perforation. A retaining mechanism causes the sprocket wheel to have a locked state, and disables the photo film from advancing when the second perforation is engaged with the second tooth. The retaining mechanism causes the sprocket wheel to have an unlocked state and enables the sprocket wheel to rotate when a shutter operates. A bias member is associated with the sprocket wheel, and operates after the sprocket wheel is rotated in a driven direction as much as a small amount by advancement of the photo film while the sprocket wheel has the unlocked state. The bias member rotates the sprocket wheel further as much as a predetermined amount in the driven direction when the second tooth is moved away from the second perforation, so as to cause the first tooth to stand by for engaging with a succeeding pair of the pairs of perforations with the first tooth in contact with the photo film. While the first tooth stands by, the photo film is advanced in contact with the tooth.

The construction for the one-frame feeding in the present invention is suitable for a compact camera or photo film unit of a low-cost type, as no circuits or photo sensor need be added. No complicated linkage is mounted. No erroneous operation is likely to occur. An inside space of a camera can be used efficiently.

To be precise, the photo film has a leader and a trailer, the trailer being retained on a spool contained in a cassette, the photo film being wound on the spool and contained in the cassette. The photo film includes the first to Nth pairs of perforations. The first and second perforations are associated with an edge of each of the frames nearer to the leader. An (N+1)th pair of perforations is formed at the regular pitch away from the Nth pair of perforations toward the trailer. The (N+1)th pair of perforations includes two perforations arranged at the regular interval away from one another. The (N+1)th pair of perforations is associated with an edge of the Nth frame nearer to the trailer.

In a preferred embodiment, a frame counter wheel indicates a number of at least one formed one of the frames. A stepping member is disposed in fashion rotatable integrally with the sprocket wheel, connected to the frame counter wheel, rotated as much as a predetermined angle, and steps the frame counter wheel in setting of one of the frames. The retaining mechanism includes a first projection projected toward the frame counter wheel. A second projection is disposed on the frame counter wheel, moved into a moving path of the first projection upon stepping to a final one of the frames at the frame counter wheel, contacted on the first projection, and retains the first projection in a disabled position in a middle of the moving path thereof. The disabled position is adapted to allowing advancing a remaining portion of the photo film succeeding the final frame.

The photo film advancing device is used in a lens-fitted photo film unit, which is pre-loaded with unexposed photo film. In the photo film, the first perforation has a size W1. The second perforation has a size W2 greater than the size W1. The second tooth is greater than the first tooth.

Reloading photo film units with photo films without care can be avoided. There is no accident of breaking photo film units to a degree unusable forever. There is no considerable increase in numbers of parts and steps of reassembly of photo film units.

BRIEF DESCRIPTION OF THE DRAWINGS

The above objects and advantages of the present invention will become more apparent from the following detailed description when read in connection with the accompanying drawings, in which:

FIG. 1 is a perspective view illustrating a lens-fitted photo film unit;

FIG. 2 is an exploded perspective view illustrating a photo film housing of the photo film unit;

FIG. 3A is an explanatory view in plan, illustrating a photo film with a cassette, and FIG. 3B is an enlarged fragment thereof;

FIG. 7 is an explanatory view illustrating the drive mechanism at the time when a succeeding smaller tooth moves into a perforation;

FIG. 9 is an explanatory view illustrating the drive mechanism in a charge position and having fed one frame of the photo film;

FIG. 18 is an explanatory view illustrating another preferred embodiment in which a size of cutouts respectively in greater teeth of a sprocket wheel is determined in relation to perforations in the photo film;

FIG. 19A is an explanatory view in plan, illustrating another preferred photo film with a cassette, in which two perforations associated with each frame have an equal shape and size;

FIG. 19B is an explanatory view in plan, illustrating a comparable photo film with a cassette, in comparison with the photo film of FIG. 19A.

DETAILED DESCRIPTION OF THE PREFERRED EMBODIMENT(S) OF THE PRESENT INVENTION

Figure 4:
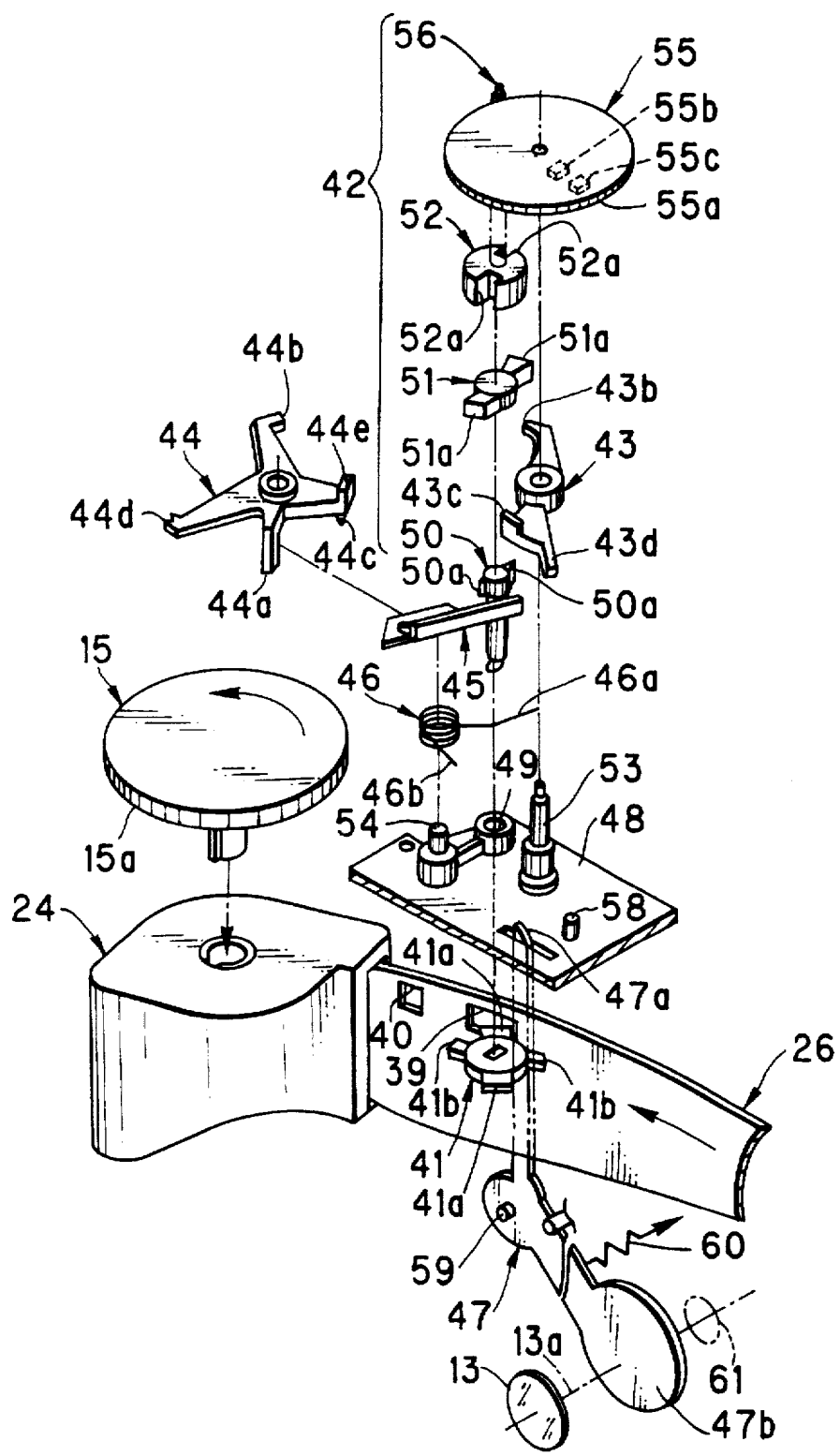
FIG. 4 is an exploded perspective view illustrating a drive mechanism for a shutter mechanism, with its relevant construction.

A photo film advancing device of the present invention is described hereinafter as an embodiment used in a lens-fitted photo film unit 10. In FIG. 1, the lens-fitted photo film unit 10 is generally constituted by a cardboard packaging 11 and a photo film housing 12. The cardboard packaging 11 has openings through which there appear a taking lens 13, a shutter release button 14, a winding wheel 15, a finder window 16, and an indicator window 17 for a frame counter.

As illustrated in FIG. 2, the photo film housing 12 consists of a photo film containing section 18, a rear cover 19, a photograph-taking section 20 and a front cover 21.

In front of the photo film containing section 18, the photo-taking unit 20 is secured in removable fashion. The photo-taking unit 20 includes the taking lens 13 for focussing of an object, a shutter blade, a one-frame winding mechanism, and a drive mechanism for the shutter charging and other objects. The photo-taking unit 20 is constructed as a unit. The rear cover 19 is secured to the rear of the photo film containing section 18 in a removable fashion. A photo film cassette 22 with a cassette is contained between the rear cover 19 and the photo film containing section 18 in light-tight fashion.

The front cover 21 is secured to the front of the photo film containing section 18 in removable fashion. The shutter release button 14 is formed with the front cover 21 by forming slits in the top of the front cover 21. Under the shutter release button 14 is formed a pressing rod 23, which presses a retaining member 44 to actuate the shutter blade, to be described later in detail.

In the photo film containing section 18, there are formed a cassette containing chamber 25 and a photo film roll chamber 27. The cassette containing chamber 25 contains a cassette shell 24. The roll chamber 27 contains a roll 26a of unexposed photo film 26 as drawn fully from the cassette shell 24. In the present embodiment, the roll 26a is formed while wound about a supply spool 28. The supply spool 28 is rotatably supported by two forks 29 and 30, which are formed on the rear cover 19, and contacted on upper and lower ends of the supply spool 28 to support the supply spool 28 within the roll 26a. It is to be noted that the supply spool 28 can be eliminated while the roll 26a is directly contained in the roll chamber 27. It is possible to eliminate the fork 29 at the same time.

Bottoms of the cassette containing chamber 25 and the roll chamber 27 are open, and are closed by bottom lids 31 and 32 after the loading of the photo film cassette 22. The bottom lids 31 and 32 have a pull-top structure formed with the rear cover 19.

Between the cassette containing chamber 25 and the roll chamber 27 is located a light-shielding tunnel 33. Behind the light-shielding tunnel 33 is formed an exposure aperture, which has a curved surface defined about an optical axis 13a passed through the taking lens 13, and adapted to contact with the photo film. On the rear cover 19 is formed a photo film support face 34 confronting a back face of the photo film. The support face 34 is curved as well as the surface of the light-shielding tunnel 33 and the photo film. It is also possible to form a light-shielding tunnel with the photo-taking unit 20. It is possible to separate the light-shielding tunnel 33 into two parts, one of which may be disposed on the photo-taking unit 20 and the other of which may be disposed on the photo film containing section 18. Namely the light-shielding tunnel 33 is formed only after the photo-taking unit 20 is fitted on the photo film containing section 18.

In front of the light-shielding tunnel 33, there is formed an opening 64 for introducing object light from the taking lens 13 to the exposure aperture. There is formed an opening 33a for containing a sprocket wheel while causing the same to emerge partially toward the photo film 26. The opening 33a is located higher than the exposure aperture and near to the cassette shell 24.

The winding wheel 15 is disposed on the top of the cassette containing chamber 25 in rotatable fashion, and engaged with a spool 35 of the cassette shell 24. The winding wheel 15 partially emerges externally through an opening 36 of the rear cover 19. The external portion of the winding wheel 15 is rotated in a counterclockwise direction to wind the photo film. The spool 35 is rotated in the winding direction to include the photo film 26 as exposed into the cassette shell 24.

Around the winding wheel 15 are formed teeth 15a. A regulating claw 37 is formed on the photo film containing section 18, and engaged with the teeth 15a. The regulating claw 37 keeps the winding wheel 15 from rotating in a clockwise direction, which is reverse to the film winding.

The photo film 26 includes a leader 26b, a photo film effective portion 26c and a trailer 26d as illustrated in FIGS. 3A and 3B. The trailer 26d is retained on the spool 35. There is a notch 26e in the leader 26b. It is possible to use a leader without forming the notch 26e. Greater perforations 39 and smaller perforations 40 are formed in the photo film 26 along one edge of the photo film effective portion 26c, and arranged at two intervals which are alternately repeated. The two pitches are referred to with signs L1 and L2. The center of the longer interval (L2) between one greater and one smaller perforations 39 and 40 is located directly above the optical axis 13a, to set one of frames 38 to be exposed.

In the course of the perforation forming, an additional greater perforation 39a is formed beside a frame 38a the nearest to the leader 26b. In the present embodiment, the frame 38a is finally exposed. Also an additional smaller perforation 40a is formed beside a frame 38b the nearest to the trailer 26d. In the present embodiment, the frame 38b is initially exposed. Consequently every one of the perforations 39 and 40 has its mated perforation distant at the shorter interval (L1). The greater perforation 39a in the leader 26b is formed at a greater size than a corresponding one formed in the known photo film. The smaller perforation 40a in the trailer 26d is formed in a position where the known photo film has no perforation.

In the photo film 26 for use in the lens-fitted film unit 10, one of the greater perforations 39 is formed directly beside one of the frames 38 in a position near to the trailer 26d. One of the smaller perforations 40 is formed directly beside one of the frames 38 and in a position opposite to the one greater perforation 39 and near to the leader 26b. Each of the greater perforations 39 is greater in the longitudinal direction of the photo film 26 than each of the smaller perforations 40. In the width direction of the photo film 26, the greater perforations 39 and the smaller perforations 40 have an equal size.

The photo-taking unit 20 includes a photo film counter mechanism in addition to the taking lens 13, the one-frame winding mechanism, and the drive mechanism. Those components are constituted by a sprocket wheel 41, a rotary member 42, a shutter drive member 43, the retaining member 44, a plate spring 45, a coil spring 46, a shutter blade 47, and a frame counter wheel 55. The shutter drive member 43 and the retainer member 44 are included in the drive mechanism.

There are two shafts 53 and 54 and a bearing hole 49 formed with an upper face of a base plate 48 of the phototaking unit 20. The shaft 53 receives the shutter drive member 43 and the counter wheel 55 in insertion. The shaft 54 receives the coil spring 46 and the retainer member 44 in insertion.

The rotary member 42 is inserted in the bearing hole 49. The rotary member 42 includes a cylinder portion 50, a shutter charge cam 51, a stopper cam portion 52, a two-toothed gear 56 as stepping member, which are formed integrally. The sprocket wheel 41 emerging through the opening 33a is connected to a bottom of the cylinder portion 50.

The sprocket wheel 41 has four teeth including two greater teeth 41a and two smaller teeth 41b. The two greater teeth 41a are disposed in rotational symmetry at an angle of 180 degrees about a circular peripheral face 41c. The two smaller teeth 41b are disposed in rotational symmetry about the peripheral face 41c. It is preferable that the length of the peripheral face 41c is as much as, or less than, a length of one frame on the photo film 26. The driven direction of the sprocket wheel 41 is counterclockwise as viewed in the drawing.

As viewed in the winding direction, the greater teeth 41a have a size greater than the size of the smaller perforations 40, and slightly smaller than the size of the greater perforations 39. The greater teeth 41a are respectively engageable only with the greater perforations 39. The smaller teeth 41b have a size engageable with the smaller perforations 40. While the photo film 26 is fed, one of the smaller teeth 41b is disengaged from one of the smaller perforations 40, and then a succeeding one of the greater teeth 41a is engaged with a succeeding one of the greater perforations 39, to terminate operation of the one-frame feeding.

The cylinder portion 50 has two projections 50a disposed in rotational symmetry about its axis, and contacted on the plate spring 45, which operates as bias member. When one of the smaller teeth 41b and a succeeding one of the greater teeth 41a are respectively engaged with one of the smaller perforations 40 and a succeeding one of the greater perforations 39, then the plate spring 45 is pressed and resiliently deformed by the projections 50a. After the succeeding one of the greater teeth 41a is disengaged from the succeeding one of the greater perforations 39, then the projections 50a is in turn pressed by the plate spring 45, to rotate the sprocket wheel 41 in the driven direction, until a succeeding one of the smaller teeth 41b is engaged with a succeeding one of the smaller perforations 40.

A distal end 46a of the coil spring 46 is engaged with a receiving portion 43a of the shutter drive member 43 (See FIG. 5), and biases the shutter drive member 43 about the shaft 53 counterclockwise in a release direction and toward an initial position. Another distal end 46b is engaged with a receiving portion 44a of the retainer member 44, and biases the retainer member 44 about the shaft 54 clockwise in a charge direction and toward a stop position. The charge cam 51 has two cam portions 51a disposed in rotational symmetry at an angle of 180 degrees. The shutter drive member 43 has a claw 43b, which is located in a rotational orbit of the cam portions 51a. While the sprocket wheel 41 makes half a rotation, one of the cam portions 51a causes the shutter drive member 43 to rotate clockwise toward a charge position against the bias of the coil spring 46.

When the photo film is fed as long as one frame, the rotary member 42 makes half a rotation in the counterclockwise direction. Two grooves 52a are formed in the stopper cam portion 52 and disposed in rotational symmetry thereabout. Upon the half rotation of the rotary member 42, a claw 44b of the retainer member 44 is received in one of the grooves 52a, to block rotation of the sprocket wheel 41. The retainer member 44 now has the stop position where the retainer member 44 stops the photo film from being wound. In the course of rotation of the retainer member 44 toward the stop position, a bottom ridge 44c of the retainer member 44 moves into a rotational orbit of a top ridge 43c of the shutter drive member 43, to maintain the shutter drive member 43 in the charge position. When the retainer member 44 rotates to the stop position, a stop claw 44d is engaged with the teeth 15a of the winding wheel 15, to hinder the photo film from being wound.

Should the shutter drive member 43 be rotated toward the charge position against the coil spring 46 during disengagement of the teeth 41a and 41b from the perforations 39 and 40, it is likely that even the bias of the plate spring 45 fails to rotate the sprocket wheel 41 in the driven direction. Accordingly the cam portions 51a are so formed as to rotate the shutter drive member 43 toward the charge position during mesh of the teeth 41a and 41b with the perforations 39 and 40.

When the shutter release button 14 is depressed, the pressing rod 23 pushes the receiving portion 44a of the retainer member 44, to rotate the retainer member 44 counterclockwise toward the initial position. Then the bottom ridge 44c is moved away from the rotational orbit of the top ridge 43c of the shutter drive member 43. The shutter drive member 43 is rotated by the bias of the coil spring 46 counterclockwise about the shaft 53. This is until a striking arm 43d comes in contact with a stopper 58. The shutter drive member 43 now has a release position. During this rotation, the striking arm 43d has stricken an arm 47a of the shutter blade 47.

When the shutter drive member 43 rotates to the release position, the top ridge 43c comes into the rotational orbit of the bottom ridge 44c of the retainer member 44, and retains the retainer member 44 in the initial position. When the retainer member 44 is in the initial position, the stop claw 44d is retracted from the teeth 15a, and the claw 44b is retracted from the grooves 52a. The photo film is allowed to be wound further.

In front of the base plate 48, there is disposed a shaft 59 in parallel with the optical axis 13a. The shutter blade 47 is supported on the shaft 59 in swingable fashion. The shutter blade 47, when driven, moves back and forth from a closing position and a open position. In the closing position, a blade portion 47b of the shutter blade 47 closes a shutter opening 61 located on the optical axis 13a under the bias of a tension spring 60. In the open position, the blade portion 47b is moved away from the shutter opening 61 to let it open. The shutter blade 47 is in the open position when driven by the shutter drive member 43.

The two-toothed gear 56 is engaged with a plurality of teeth 55a arranged about the counter wheel 55. When the sprocket wheel 41 makes half a rotation, one tooth of the two-toothed gear 56 causes the counter wheel 55 to rotate clockwise as much as one step. A top face of the counter wheel 55 has a series of numbers, arranged circularly as frame number indication in association with a rotational pitch. The series of the numbers is in an order to indicate the remaining number of unexposed frames, which is observable through the indicator window 17.

After taking an exposure on the frame 38a, it is necessary to wind all the photo film 26 into the cassette shell 24. There are formed cam projections 55b and 55c under the counter wheel 55 as disabling device. In the course of the film winding after exposing the frame 38a, a top projection 44e of the retainer member 44 is moved to a position between the cam projections 55b and 55c. Then the claw 44b of the retainer member 44 is moved out of the grooves 52a, and the stop claw 44d is moved away from the teeth 15a. The bottom ridge 44c comes into the rotational orbit of the top ridge 43c of the shutter drive member 43, so that the retainer member 44 is maintained in a disabled position, in which the retainer member 44 allows inclusion of the photo film, and the shutter drive member 43 is kept in the charge position.

Figure 5:
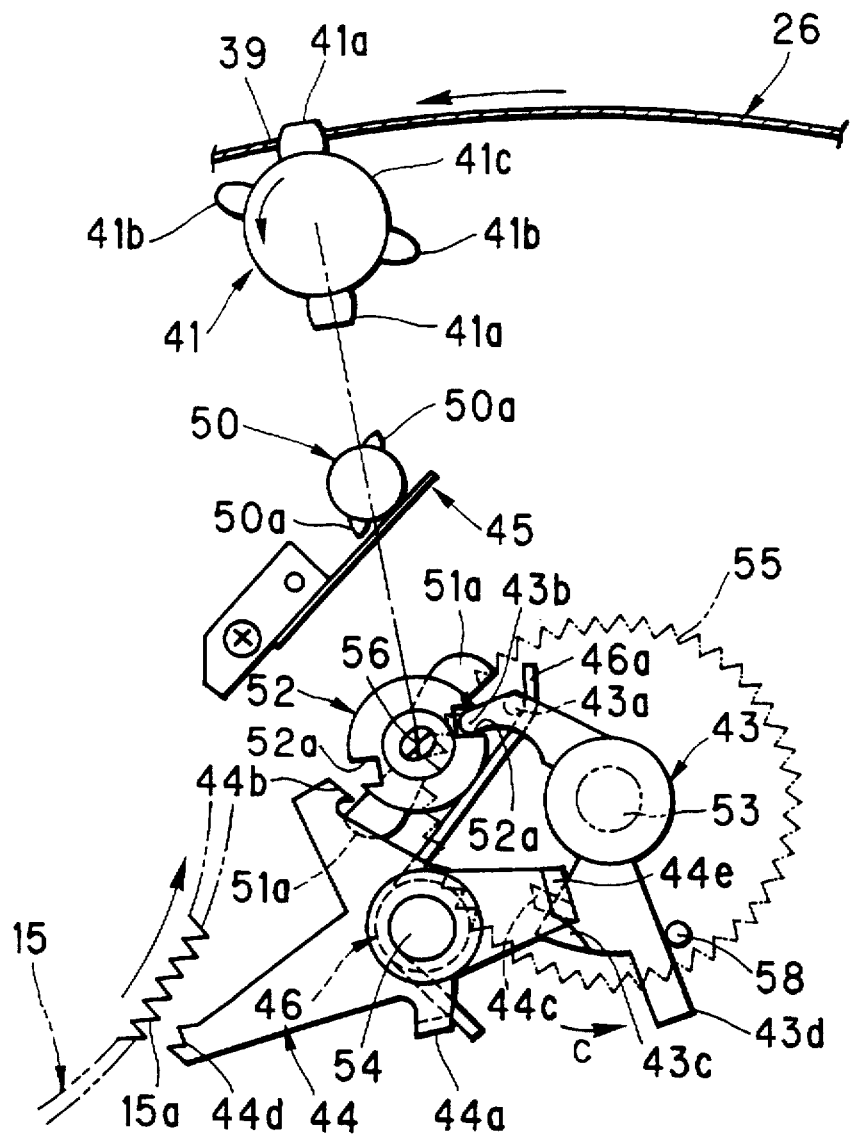
FIG. 5 is an explanatory view illustrating the drive mechanism in a release position.

Operation of the above construction is described now. After taking one exposure, one of the greater teeth 41a of the sprocket wheel 41 is being engaged with one of the greater perforations 39 while a preceding one of the smaller teeth 41b is disengaged from a preceding one of the smaller perforations 40, as illustrated in FIG. 5. One of the projections 50a of the cylinder portion 50 stands by for deformation of the plate spring 45 with resiliency. The top ridge 43c of the shutter drive member 43 is in the rotational orbit of the bottom ridge 44c of the retainer member 44, to maintain the retainer member 44 in the initial position.

Figure 6:
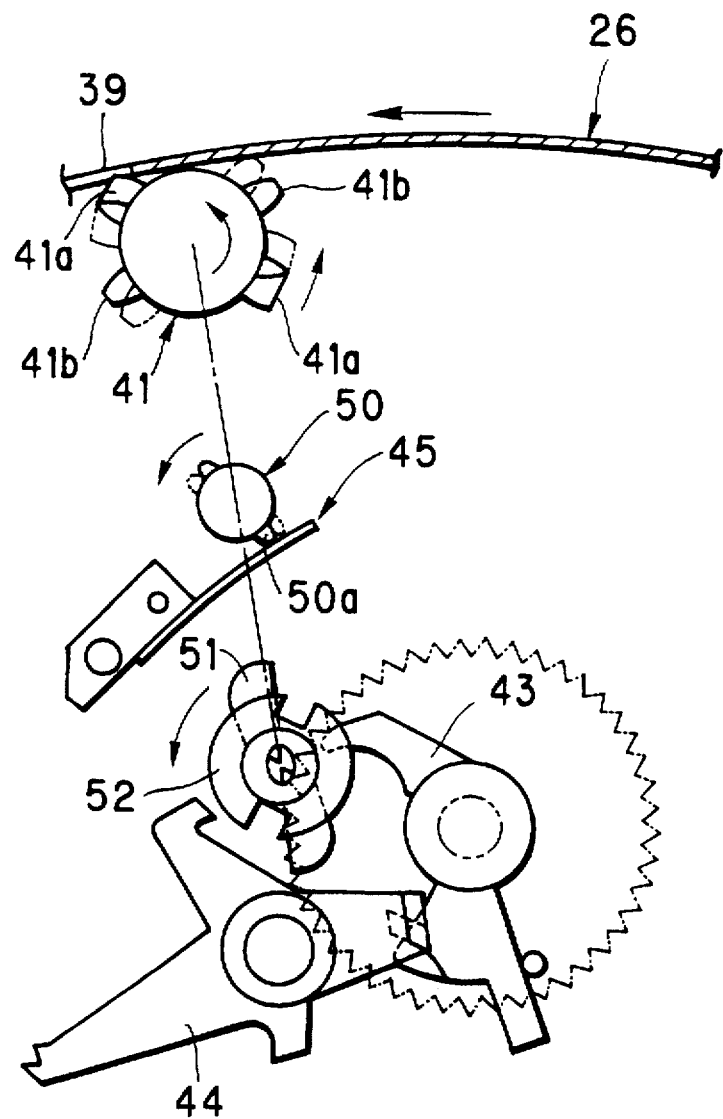
FIG. 6 is an explanatory view illustrating the drive mechanism at the time when a greater tooth moves away from a perforation.

When the winding wheel 15 is rotated counterclockwise to wind the photo film, the photo film 26 is fed in the winding direction. The sprocket wheel 41 is rotated in the counterclockwise direction, in the course of engagement of the one greater tooth 41a with the one greater perforation 39. The projections 50a is rotating, as illustrated in FIG. 6, while pressing and deforming the plate spring 45. When the one greater tooth 41a is disengaged from the one greater perforation 39, the projections 50a has a position indicated by the solid lines in the FIG. 6. Now the plate spring 45 presses a face of the projections 50a in the counterclockwise direction. Accordingly the sprocket wheel 41 is rotated in the driven direction by the bias of the plate spring 45 upon disengagement of the one greater tooth 41a from the one greater perforation 39.

The rotation of the sprocket wheel 41 is effected until a succeeding one of the smaller teeth 41b comes to the photo film 26, to have the state as indicated by the broken line. The rotation is instantaneous under the bias of the plate spring 45. The photo film 26 has been fed at an amount shorter than one frame, so that a succeeding one of the smaller perforations 40 has not come yet. The rotation of the sprocket wheel 41 is once stopped when a face of the one smaller tooth 41b comes in contact with the photo film 26. While the sprocket wheel 41 is stopped, the photo film 26 is fed in contact with the one smaller tooth 41b and the peripheral face 41c with slip. The contact of the one smaller tooth 41b causes no problem, because it contacts outside the frames.

Figure 8:
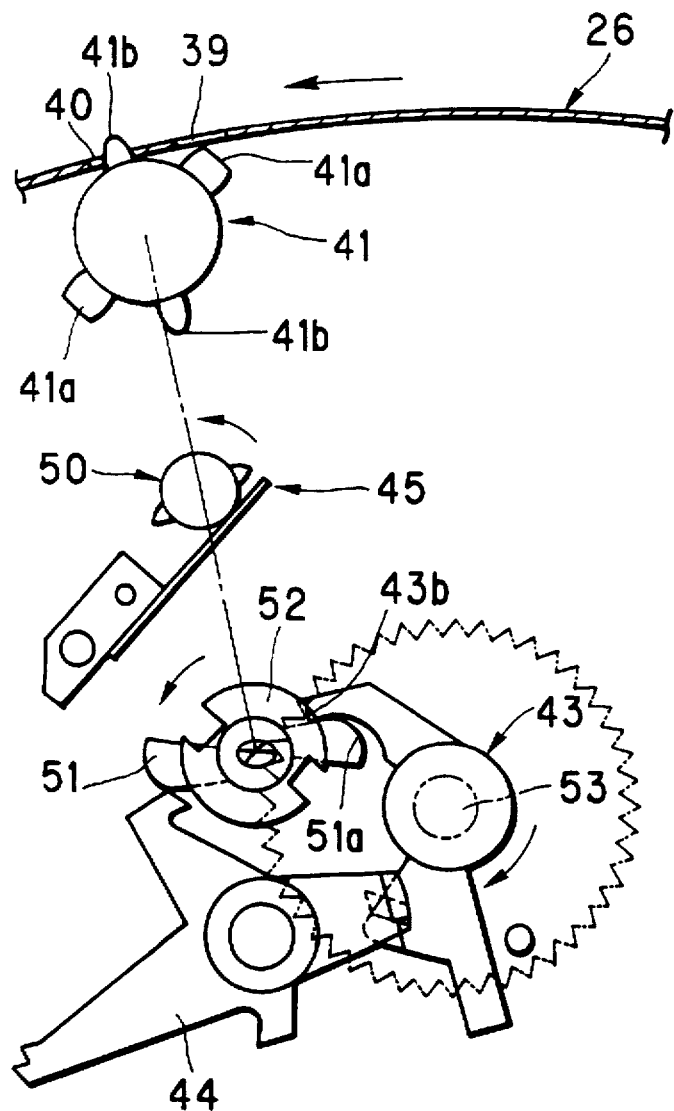
FIG. 8 is an explanatory view illustrating the drive mechanism in charging the shutter mechanism.

In the course of the further winding, the succeeding one of the smaller perforations 40 is moved to the sprocket wheel 41. As illustrated in FIG. 7, the one smaller tooth 41b comes in mesh with the one smaller perforation 40, so that the photo film 26 comes to rotate the sprocket wheel 41 in the driven direction. The plate spring 45 does not stop pressing the projections 50a until engagement of the one smaller tooth 41b with the one smaller perforation 40, the engagement being made reliable. As illustrated in FIG. 8, the projections 50a rotates away from the plate spring 45 with the one smaller tooth 41b engaged with the one smaller perforation 40. The sprocket wheel 41 is released from being biased by the plate spring 45.

When the one smaller tooth 41b comes in mesh with the one smaller perforation 40, one of the cam portions 51a presses the claw 43b to cause the shutter drive member 43 to rotate toward the charge position about the shaft 53. In a halfway step during the rotation of the shutter drive member 43 toward the charge position, the top ridge 43c lies in the rotational orbit of the bottom ridge 44c. The retainer member 44 still has the initial position.

When the shutter drive member 43 comes to the charge position, the top ridge 43c comes away from the rotational orbit of the bottom ridge 44c, to release the retainer member 44 from retention in the initial position. Then the retainer member 44 is rotated by the bias of the coil spring 46 toward the stop position. During this rotation, the bottom ridge 44c comes into the rotational orbit of the top ridge 43c. The retainer member 44 maintains the shutter drive member 43 in the charge position.

When the photo film 26 is fed as long as one frame, the sprocket wheel 41 makes half a rotation as illustrated in FIG. 9. So does the rotary member 42. Then the grooves 52a of the stopper cam portion 52 receives the claw 44b of the retainer member 44, which now has the stop position. The sprocket wheel 41 is kept from rotating. Also the winding wheel 15 is stopped from rotating, as the stop claw 44d is in mesh with the teeth 15a of the winding wheel 15.

During the rotation of the retainer member 44 to the stop position, the bottom ridge 44c lies within the rotational orbit of the top ridge 43c of the shutter drive member 43. The shutter drive member 43 is still kept in the charge position. The sprocket wheel 41 making the half rotation, one tooth of the two-toothed gear 56 causes the counter wheel 55 rotationally to step down as much as one.

To take an exposure, the shutter release button 14 is depressed. The pressing rod 23 on the bottom of the shutter release button 14 pushes the receiving portion 44a in the direction B indicated by the arrow. The retainer member 44 is rotated against the bias of the coil spring 46 counterclockwise toward the initial position. The bottom ridge 44c of the retainer member 44 comes away from the rotational orbit of the top ridge 43c, so that the shutter drive member 43 is instantaneously rotated to the release position by the coil spring 46, to have the status of FIG. 5.

During the rotation of the shutter drive member 43 to the release position, the striking arm 43d strikes the shutter blade 47. The shutter blade 47 moves back and forth one time, rotationally about the shaft 59. During the movement back and forth, object light passed through the taking lens 13 is introduced to the photo film 26 set on the exposure aperture, to take an exposure. When the shutter drive member 43 comes to the release position, the top ridge 43c comes in the rotational orbit of the bottom ridge 44c, to retain the retainer member 44 in the initial position.

Exposures are taken by repeating similar operation. After exposing the frame 38a of the photo film 26, the mechanisms have the status of FIG. 5 again. The photo film is wound, to rotate the shutter drive member 43 to the charge position. Then the retainer member 44 is released from being kept in the initial position. The bias of the coil spring 46 rotates the retainer member 44 toward the stop position.

During this rotation, the bottom ridge 44c comes into the rotational orbit of the top ridge 43c. The retainer member 44 maintains the shutter drive member 43 in the charge position. When the photo film 26 is fed, the sprocket wheel 41 rotates. So does the two-toothed gear 56, which causes the counter wheel 55 rotationally to step down as much as one, to indicate "0" or "E" in the indicator window 17. Upon the stepping of the counter wheel 55, the cam projection 55b comes into the rotational orbit of the top projection 44e of the retainer member 44. The top projection 44e lies between the cam projections 55b and 55c, which maintains the retainer member 44 in the disabled position for the inclusion of the photo film.

This being so, the claw 44b is moved away from the grooves 52a, to make the sprocket wheel 41 free. The stop claw 44d is moved away from the teeth 15a, to allow winding the photo film. The retainer member 44 is keeping the shutter drive member 43 in the charge position. Although the greater perforation 39a next to the frame 38a has come, the winding wheel 15 is not stopped. No exposure is taken on the leader 26b outside the photo film effective portion 26c.

Then the leader 26b, not having the perforations 39 and 40, is moved past the sprocket wheel 41. One of the greater teeth 41a has been disengaged from one of the greater perforations 39. A succeeding one of the smaller teeth 41b comes to the leader 26b, as indicated by the broken lines in the FIG. 6. The photo film 26 is allowed to be fed while contacted on the smaller teeth 41b and the peripheral face 41c with slip. It is possible to include all the photo film 26 in the cassette shell 24.

After taking the final exposure, the shutter release button 14 may receive depressing force during the film winding. The retainer member 44, which would be moved by the shutter release button 14 toward the initial position, is stopped by the cam projection 55b from moving toward the initial position, so that the shutter drive member 43 is still kept in the charge position without being released.

The lens-fitted film unit 10 after taking the exposures is forwarded to a photo laboratory. In the photo laboratory, the bottom lid 31 of the rear cover 19 is opened to remove the cassette shell 24. The photo film 26 as exposed is subjected to development and printing in widely used techniques. After this, photographic prints are provided for the user of the photo film with the developed film returned. The lens-fitted film unit 10 as emptied is withdrawn collectively and recycled. It is noted that in FIGS. 5–9, the sprocket wheel 41 and the cylinder portion 50 are shown in displacement along the one-dot-dash line, for avoiding much complexity in the drawings. The coil spring 46 is omitted from FIGS. 6–9 only for a similar purpose.

In the above embodiment, the sprocket wheel 41 finishes rotating upon termination of the one-frame feeding, with one of the greater teeth 41a engaged with the one of greater perforations 39. The present invention is also applicable to other constructions, in one of which the one-frame feeding is terminated with one of the smaller teeth 41b engaged with one of the smaller perforations 40, and in another of which the one-frame feeding is terminated with the teeth 41a and 41b disengaged from the perforations 39 and 40. It is preferred that the one-frame feeding is terminated with any of the teeth engaged with at least one of the perforations, because the photo film 26 should be kept immovable while the shutter is released.

In the above embodiment, one of the projections 50a is pressed by the plate spring 45 during the one-frame feeding of the photo film 26 to drive the sprocket wheel 41 rotationally. In contrast, it is possible in another preferred embodiment to dispose a pressing lever 70 in FIG. 10, instead of the plate spring 45. The pressing lever 70 operates with the shutter drive member 43, and transmits the bias of the coil spring 46 as a bias member to a sprocket wheel 72.

Figure 10:
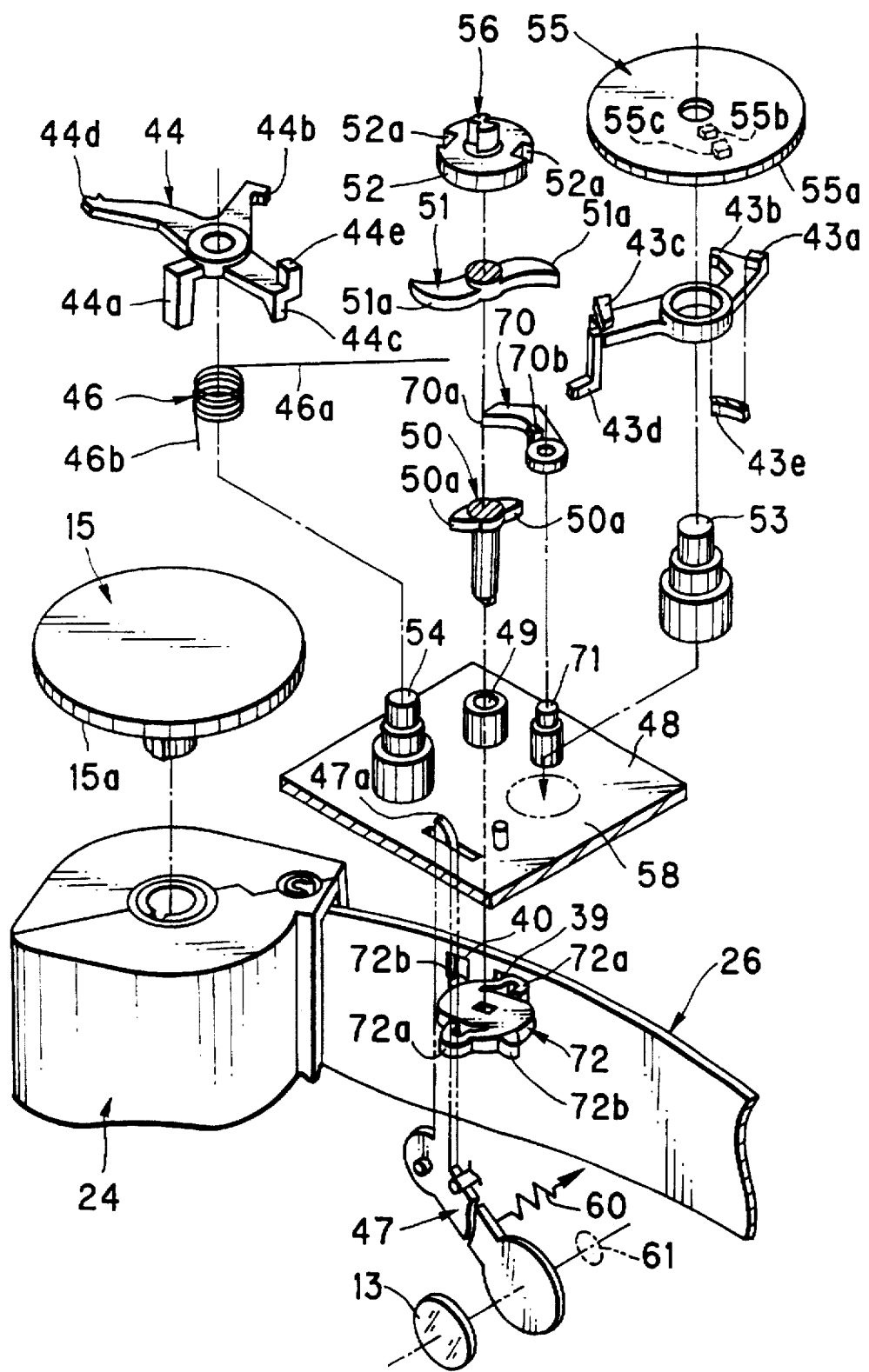
FIG. 10 is an exploded perspective view illustrating another preferred drive mechanism for a shutter mechanism, with its relevant construction, in which a pressing lever transmits bias of a coil spring as a bias member to a sprocket wheel.

In FIG. 10, the pressing lever 70 is supported in rotatable fashion about a shaft 71 on the base plate 48, and has a distal end 70a coming into a rotational orbit of the projections 50a of the cylinder portion 50. On the pressing lever 70 is formed a ridge 70b integrally therewith. The shutter drive member 43 has a pressing projection 43e, formed integrally therewith, for coming into a rotational orbit of the ridge 70b, in addition to the receiving portion 43a, the claw 43b, the top ridge 43c and the striking arm 43d.

The sprocket wheel 72 has four teeth including two greater teeth 72a in rotational symmetry and two smaller teeth 72b in rotational symmetry. There are formed cutouts respectively in the greater teeth 72a, which are deformable with resiliency toward the inside of the sprocket wheel 72.

Figure 11:
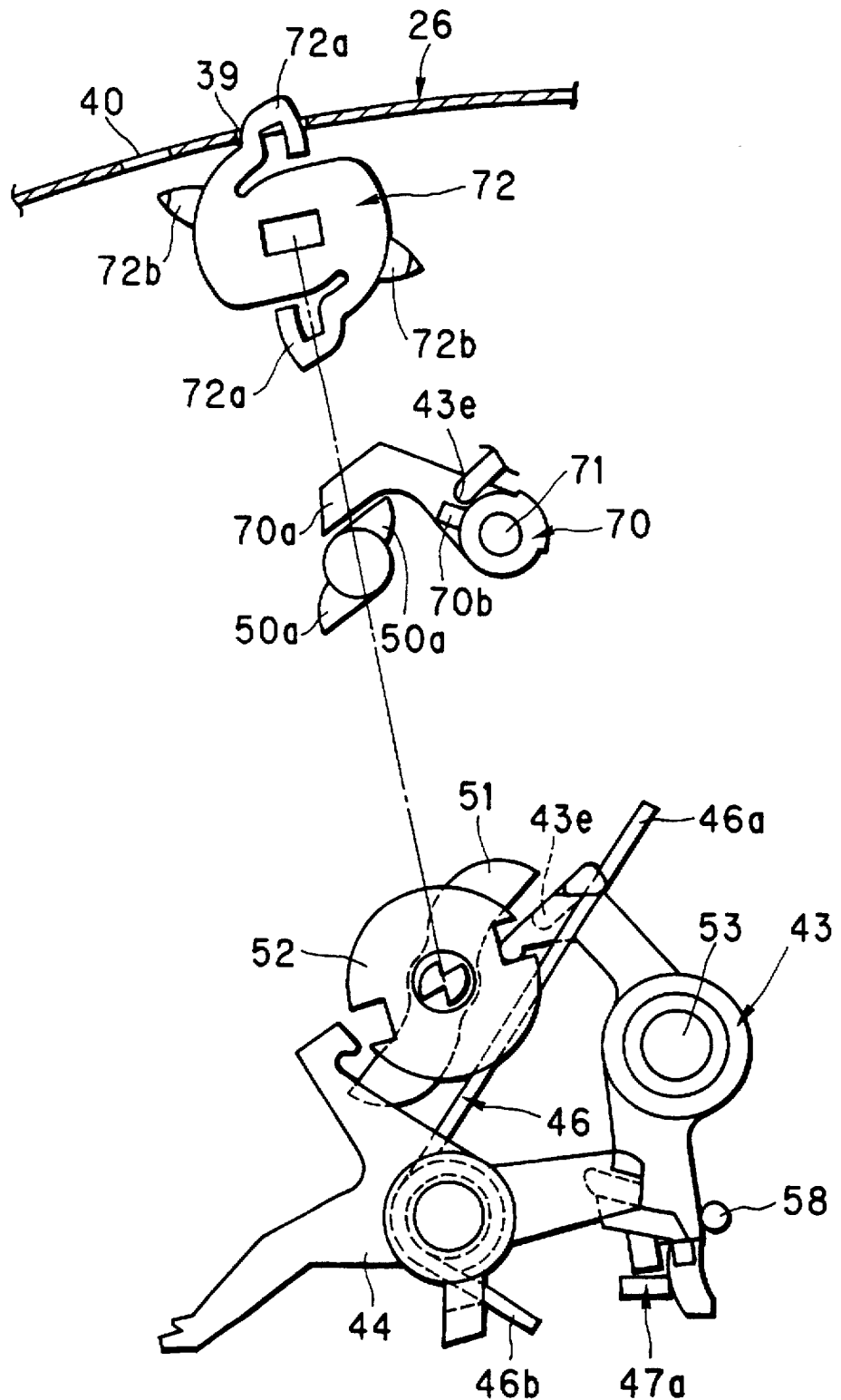
FIGS. 11–15 are explanatory views illustrating the drive mechanism of FIG. 10 and respectively corresponding to FIGS. 5–9.

After releasing the shutter, the sprocket wheel 72 is stopped with one of the greater teeth 72a engaged with one of the greater perforations 39, as illustrated in FIG. 11. The shutter drive member 43 has the release position. The striking arm 43d is contacted on the stopper 58, and remains shifted against the bias of the coil spring 46. The pressing lever 70 is free, as the pressing projection 43e does not press the ridge 70b.

Figure 12:
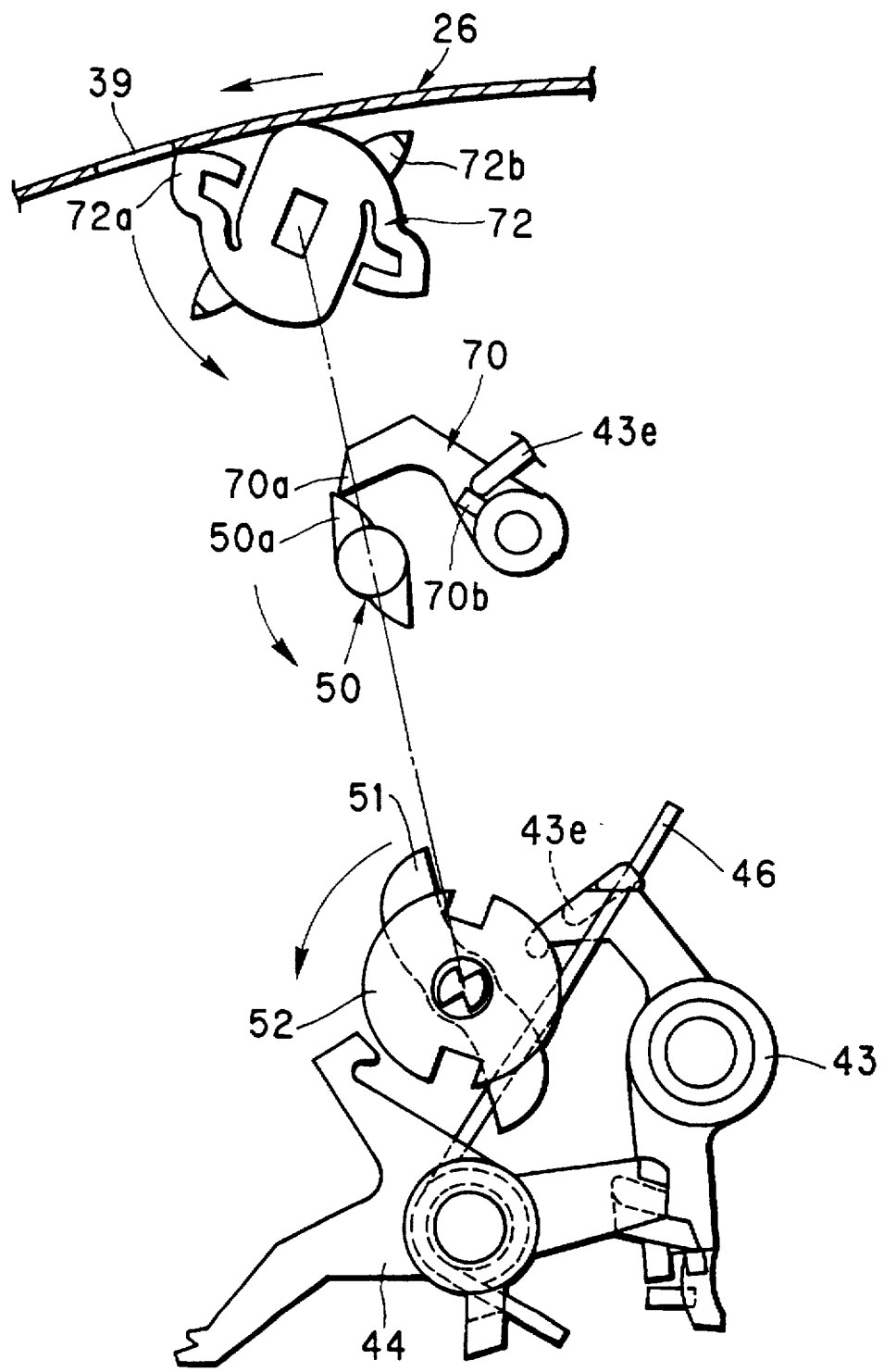

When the photo film is wound, the sprocket wheel 72 is rotated by the movement of the photo film 26 in the counterclockwise direction. As illustrated in FIG. 12, the one greater tooth 72a is moved away from the one greater perforation 39. The shutter drive member 43 is rotated toward the charge position to a small extent, so that the shutter drive member 43 does not move past the arm 47a of the shutter blade 47. One of the projections 50a has rotated to the position in which a face of the projections 50a opposite to a rotationally advancing side contact the distal end 70a.

The one greater tooth 72a of the sprocket wheel 72 is moved away from the one greater perforation 39, before the sprocket wheel 72 is rotated by use of the pressing lever 70, not by the photo film 26, the distal end 70a contacting the face of the projections 50a opposite to a rotationally advancing side. To bias the pressing lever 70, the coil spring 46 operates to bias the shutter drive member 43 release position via the pressing projection 43e and the ridge 70b.

Figure 13:
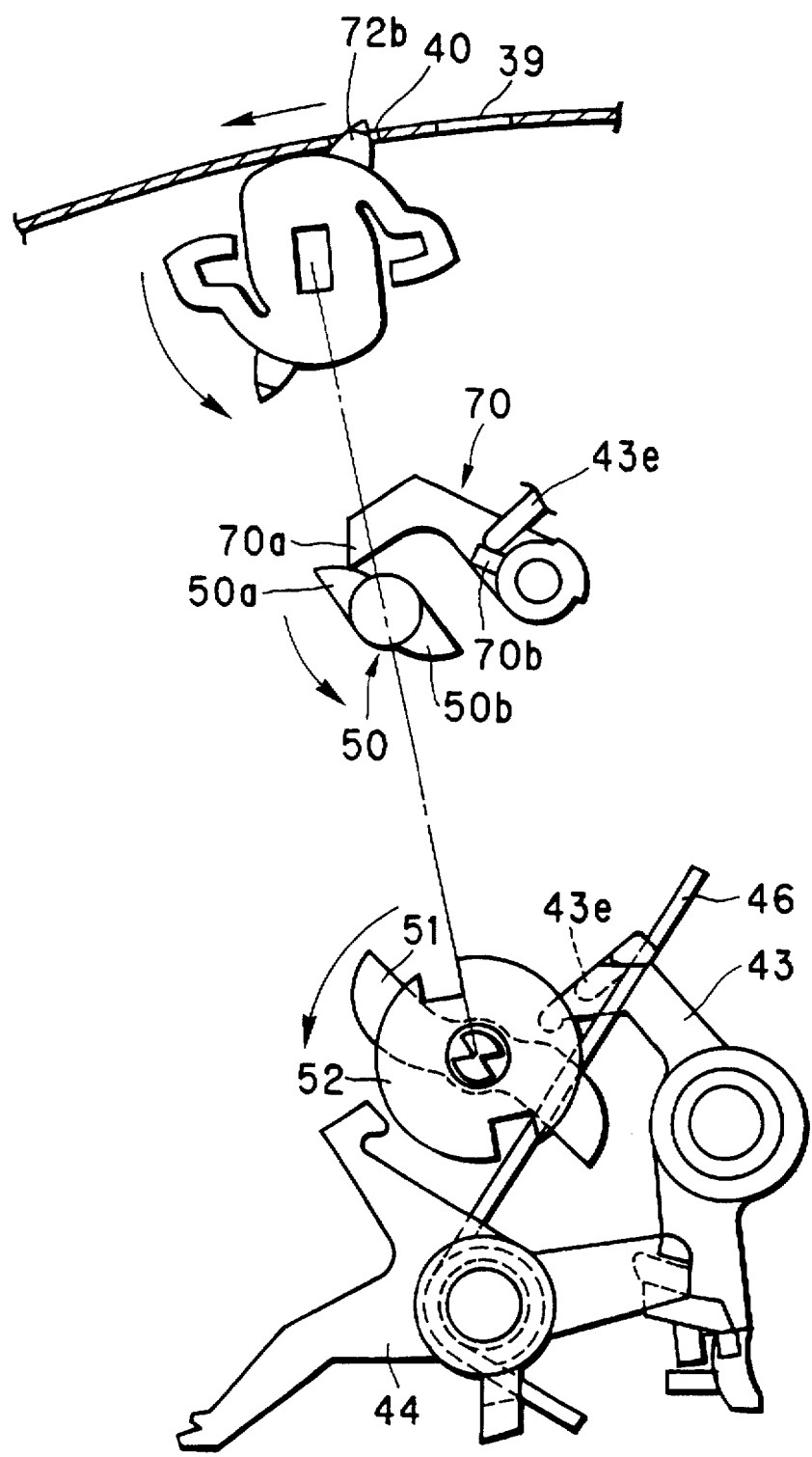

Then rotation of the sprocket wheel 72 is once stopped when a face of a succeeding one of the smaller teeth 72b comes in contact with the photo film 26. While the sprocket wheel 72 is stopped, the photo film 26 is fed in contact with the one smaller tooth 72b and a circular peripheral face with slip. The pressing lever 70 is still being biased. As illustrated in FIG. 13, a succeeding one of the smaller perforations 40 comes to, and is engaged smoothly with, the one smaller tooth 72b.

Figure 14:
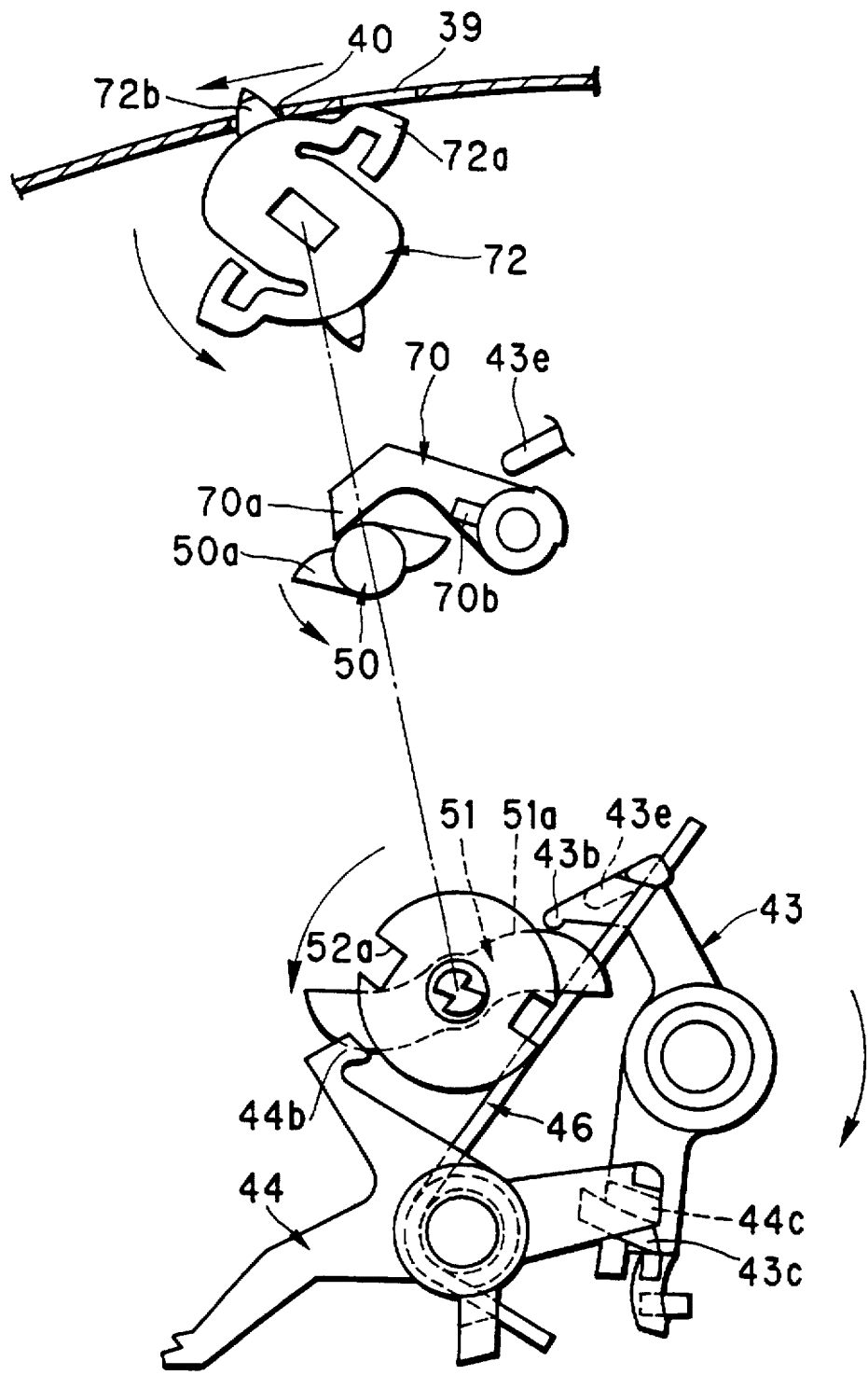

When the one smaller tooth 72b comes in mesh with the one smaller perforation 40, the pressing lever 70 finishes pressing the projections 50a as illustrated in FIG. 14, before the movement of the photo film 26 rotates the sprocket wheel 72 in the counterclockwise direction. One of the cam portions 51a of the charge cam 51 contacts the claw 43b, of which the shutter drive member 43 is rotated toward the charge position against the bias of the coil spring 46.

Figure 15:
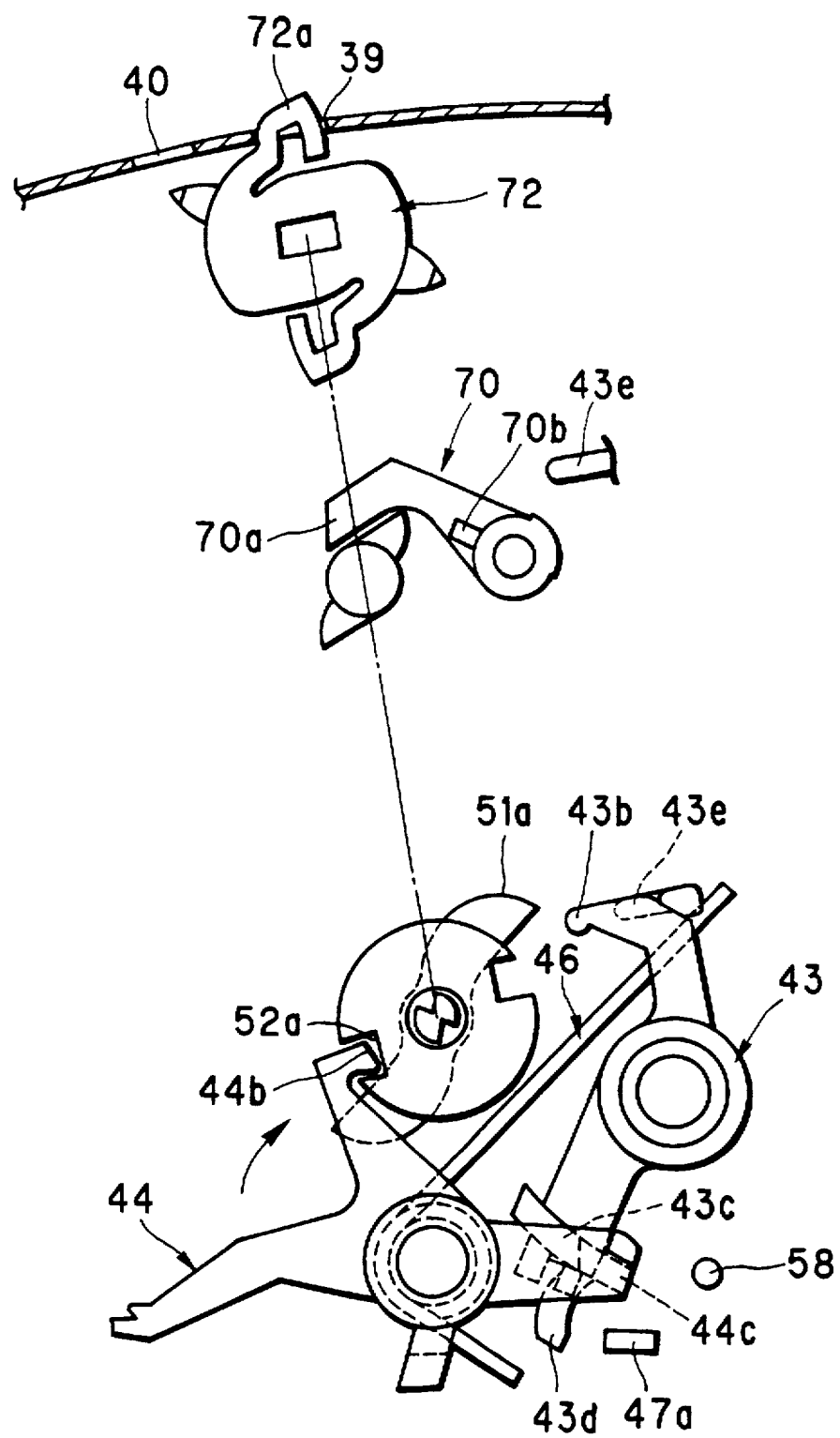

In movement of the photo film 26, the one of the cam portions 51a causes the shutter drive member 43 to rotate to the charge position slightly before engagement of a succeeding one of the greater teeth 72a with a succeeding one of the greater perforations 39. The top ridge 43c is moved out of the rotational orbit of the bottom ridge 44c, of which the retainer member 44 rotates to the stop position. When the photo film 26 is fed as long as one frame, the sprocket wheel 72 makes half a rotation. As illustrated in FIG. 15, the claw 44b is inserted in one of the grooves 52a, and the retainer member 44 has the stop position.

When the retainer member 44 rotates to the stop position, it keeps the sprocket wheel 72 from rotating and the winding wheel 15 from being operated for the film winding. The bottom ridge 44c comes into a rotational orbit of the top ridge 43c, to retain the shutter drive member 43 in the charge position. The cam portions 51a are moved away from the rotational orbit of the claw 43b, to enable the shutter drive member 43 to rotate to the release position.

Upon releasing of the shutter, the retainer member 44 is rotated toward the initial position. As illustrated in FIG. 11, the shutter drive member 43 is instantaneously rotated to the release position. During this rotation, the striking arm 43d strikes the arm 47a, to take an exposure. The striking arm 43d comes in contact with the stopper 58, to stop rotation of the shutter drive member 43 in the release position. The striking arm 43d contacts the stopper 58 shortly before the pressing projection 43e contacts the ridge 70b of the pressing lever 70, so that the sprocket wheel 72 is not biased in the driven direction. There occurs no shake or blur of the photo film 26, on which an image can be taken in sharp fashion.

There may be an accident where a smaller tooth is engaged with a greater perforation without engagement with a smaller perforation. It is difficult for the sprocket wheel 41 of FIGS. 4-9 to overcome such an accident, as one of the greater teeth 41a succeeding the improperly engaged smaller tooth comes to interfere with the photo film 26, to block the film winding. In contrast, the sprocket wheel 72 of FIGS. 11-15 has an advantage in that, in such a situation, one of the greater teeth 72a in succession is caused by the photo film 26 to deform inside the sprocket wheel 72 with resiliency, to enable the sprocket wheel 72 still to rotate in the driven direction. No more film than one frame is wasted by the accidental situation.

Figure 16:
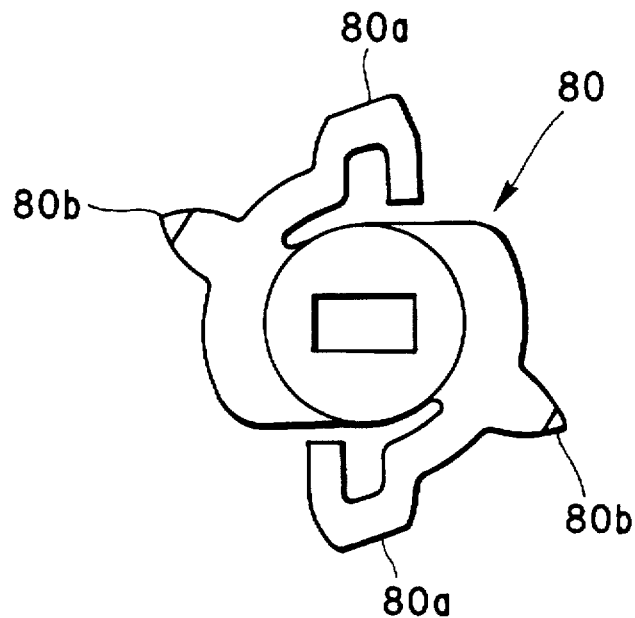
FIG. 16 is a plan view illustrating another preferred sprocket wheel in which cutouts are formed respectively in greater teeth which are retractable with resiliency.
Figure 17:
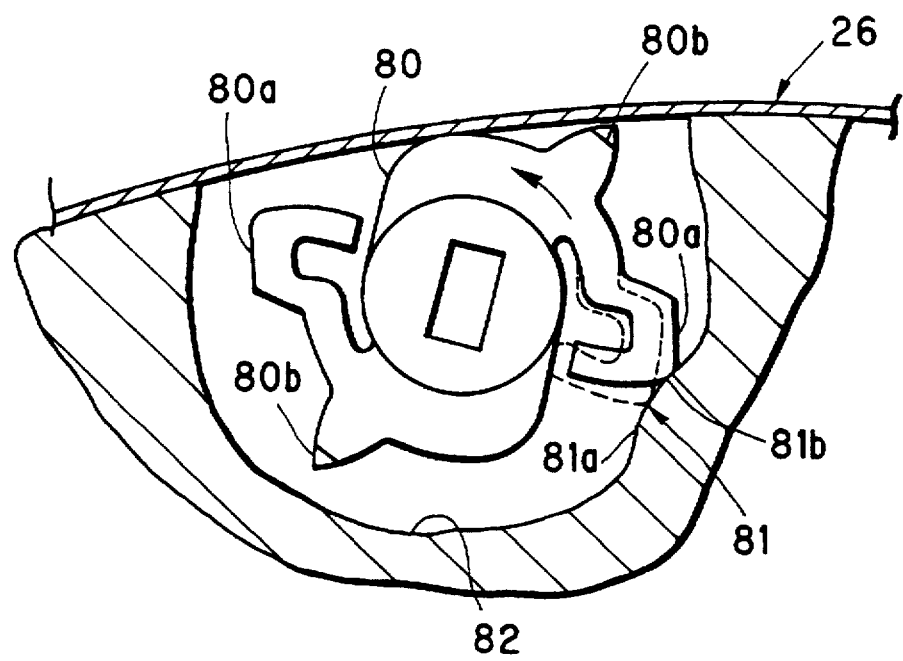
FIG. 17 is a section illustrating a gear box formed to support the sprocket wheel in rotatable fashion.

In still another preferred embodiment of FIGS. 16 and 17, it is possible to dispose a sprocket wheel 80 similar to the sprocket wheel 72, and a pressing projection 81 for depressing each of two greater teeth 80a of the sprocket wheel 80. The greater teeth 80a are in rotational symmetry. Two smaller teeth 80b of the sprocket wheel 80 are also in rotational symmetry. There are formed cutouts respectively in the greater teeth 80a, which are deformable with resiliency toward the inside of the sprocket wheel 80. To mold the sprocket wheel 80, it is preferable to use engineer plastic material, including acrylonitrile-butadiene-styrene (ABS), polypropylene (PP), polyacetal (POM), polybutylene terephthalate (PBT), polymethyl methacrylate (PMMA), polycarbonate (PC), polyamide (PA) and liquid crystal polymer (LCP).

The pressing projection 81 is formed to project from the inside of a gear box 82, which is formed to support the sprocket wheel 80 in rotatable fashion. The pressing projection 81 is constituted of upward and downward walls 81a and 81b. The upward wall 81a deforms one of the greater teeth 80a while two of the smaller teeth 80a and 80b preceding the one greater tooth 80a are engaged with successive two of the perforations 39 and 40. The downward wall 81b causes the sprocket wheel 80 to rotate in the driven direction by means of resiliency of the succeeding one of the greater teeth 80a, in a period beginning when the preceding one of the greater teeth 80a moves away from the greater perforations 39, and ending when a succeeding one of the smaller teeth 80b comes in mesh with a succeeding one of the smaller perforations 40.

In the above embodiments, each photo film advancing device is adopted in the lens-fitted photo film unit preloaded with photo film. The present invention is also applicable to a widely used camera usable plural times with new photo film loaded therein. There are cameras in which the photo film is automatically fed. It is desirable that the spool 35 is rotated by a motor instead of the winding wheel 15 immediately after a shutter releasing operation. When rotation of the sprocket wheel 41 is blocked while the motor is driven, load applied to the motor may be detected, so that the motor can be controlled to stop.

In the above embodiment, two perforations are associated with each frame on the photo film 26. The present invention is also applicable to photo film in which each frame is associated with a set of one greater perforation and plural smaller perforations. The invention is also applicable to photo film in which each frame is associated with one perforation. A sprocket wheel for use with such photo film can have teeth of which the number and a shape can be determined suitably for the numbers and shapes of the perforations.

The invention is of course applicable to photo film in which each greater perforation is greater in the width direction of the photo film than each smaller perforation; applicable to photo film in which two kinds of perforations are different in shapes, for example circular, triangular, and the like, without great difference in size; and applicable to photo film in which two perforations associated with each frame has an equal shape and size. In any of those variants, a sprocket wheel for use therewith can have teeth formed suitably for the perforations.

It is also to be noted that the novel photo film, in which each pair of one smaller and one greater perforations is associated with one frame, is produced through a line completely independent from one for producing the known photo film in which two perforations associated with each frame have an equal shape and size. However it is possible to form the novel photo film by treating the known photo film. To be precise, the known photo film, produced in a first line, is conveyed through a second line. The known photo film is punched at every one of two perforations included in each pair, to enlarge the one perforation, thereby to obtain the novel photo film.

It is to be noted that the supply spool 28, supported by the two forks 29 and 30 of the rear cover 19, is released from engagement with the photo film 26 when effecting a final step of the film winding.

In FIG. 3, the greater perforations 39 and the additional greater perforation 39a have the size elongated toward the trailer 26d as much as (W2−W1) over the size of the smaller perforations 40 and the additional smaller perforation 40a.

FIG. 18 illustrates another preferred embodiment in which a size of cutouts respectively in greater teeth 156 of a sprocket wheel is determined precisely. Let W be a size of the greater teeth 156 in the winding direction. Let W1 be a size of the smaller perforations 40 as viewed in the winding direction. The sizes meet the condition that W>W1. Let W2 be a size of the greater perforations 39 as viewed in the winding direction. W2 is substantially equal to, or slightly smaller than, W so that the greater teeth 156 comes in mesh only with the greater perforations 39.

In the greater teeth 156 are formed cutouts 159. Proximal ends 156a of the greater teeth 156 are connected to a circular peripheral face 152a of a sprocket wheel 152. Let W3 be a thickness of the proximal ends 156a. A reference numeral 140 designates an area of a smaller perforation having a size of W1. W3 meets the condition that W3<W2−W1.

As the greater teeth 156 are connected to the peripheral face 152a only via the proximal ends 156a, the greater teeth 156 is rendered deformable resiliently due to the thinness of the proximal ends 156a. There may be an accident where one of smaller teeth 157 is engaged with one of the greater perforations 39 without engagement with the smaller perforations 40. It would be difficult for the formerly described sprocket wheel 41 without cutouts to overcome such an accident, as one of the greater teeth 41a succeeding the improperly engaged smaller tooth would not confront any perforation. The one greater tooth 41a has not resiliency, and would come to interfere with the photo film 26, to block the film winding. The lens-fitted photo film unit would become useless.

In contrast, the sprocket wheel 152 of the present embodiment has an advantage in that, in such a situation, one of the greater teeth 156 in succession is caused by the photo film 26 to deform inside the sprocket wheel 152 with resiliency at the proximal ends 156a, to enable the sprocket wheel 152 still to rotate in the driven direction. No more film than one frame is wasted by the accidental situation.

The proximal ends 156a of the greater teeth 156 have a previously adjusted thickness such that they can be deformed only when pressed with higher force than the force from the greater perforations 39. No problem arises in ordinary rotation in driven fashion.

It is general that a user places an order to a photo finisher for development and printing of the film in a lens-fitted photo film unit. It is, however, likely that some users remove the photo film cassette from the lens-fitted film unit by himself, and reload the emptied lens-fitted film unit with a new film and cassette for the purpose of the reuse. In the present invention, the size W of the greater teeth 156 of the sprocket wheel 152, as illustrated in FIG. 18, is great enough to be prevented from engagement with the smaller perforation area 140 of the known photo film of the commercially available standard type. A novel lens-fitted film unit cannot be reloaded with a film and cassette. Some of the reloading users may think of partially cutting off the greater teeth 156 for a smaller size engageable with the smaller perforation area 140. But it is inevitable that the proximal ends 156a of the greater teeth 156 at the peripheral face 152a are cut down by the users, to cut off all of the greater teeth 156 around the sprocket wheel 152. It is therefore possible to avoid reloading lens-fitted film units with a new film and cassette.

In a preferred mode of the present invention, the photo film cassette 22 in FIG. 1 is a type in which rotation of a spool 211 (See FIG. 19A) causes the leader 26b of the photo film 26 to advance to the outside of the cassette shell 24. The photo film 26 has an emulsion surface and a back surface reverse thereto. The back surface is coated with a magnetic recording material having transparency, as a layer. There is information which represents a maximum number of photographable frames on the film and is prerecorded to the magnetic recording layer.

The photo film cassette 22, after effecting exposures, is deposited to a photo laboratory, where the photo film cassette 22 is set in an automatic developing/printing apparatus. The developing/printing apparatus rotates the spool 211 in the unwinding direction, to advance the leader 26b through a passage port toward the outside. A tongue-like jig is inserted into the photo film cassette 22, which disengages the trailer 26d from the spool 211. The photo film 26 is conveyed into the developing/printing apparatus, and developed. The photo film 26 is next subjected to printing operation, which produced a print from each frame.

For control of the one-frame feeding in the automatic developing/printing apparatus, one of the smaller perforations 40 associated with an edge of one frame nearer to the leader 26b is used for positioning one frame in a printing station. To raise a printing speed, the photo film 26 is fed from the leader 26b toward the trailer 26d first at a high speed. A photo sensor is detecting the greater and smaller perforations 39 and 40. Upon detection of each of the smaller perforations 40 in a direction toward the trailer 26d, the feeding speed is changed over from the high speed to a low speed. A succeeding one of the greater perforations 39 comes to the photo sensor, which detects upstream and downstream edges of the one greater perforation 39. Upon the detection of its downstream edge, the photo film is stopped from being fed, to position the frame 38 in the printing station.

If the photo film 26 did not have the additional greater perforation 39a, the frame 38 would not be positioned in the control of the one-frame feeding. However the photo film 26 has the additional greater perforation 39a at the shorter pitch L1 from one of the smaller perforations 40 near to the leader 26b. It is possible to set the center of the longer interval (L2) between the greater and smaller perforations 39 and 40 in the center of the printing station, namely the optical axis of a printing lens. In the automatic developing/printing apparatus, the information is read from the magnetic recording layer for the printing of frames, before the trailer 26d is retained again on the spool 211 to include the photo film 26 into the cassette shell 24. In the photo laboratory, the cassette shell 24 after the printing is taken out of the developing/printing apparatus, and returns the cassette shell 24 containing the photo film 26 to the user while the photographic prints are supplied.

In operation of the cassette loading, the cassette shell 24 is inserted in the cassette containing chamber 25, and the roll 26a from the cassette shell 24 is inserted in the roll chamber 27. The photo film 26 is drawn initially at an amount of setting the frame 38b in an exposure aperture 236a (See FIG. 20) to be exposed, and then at an amount of slightly more than the shorter pitch L1 between the greater and smaller perforations 39 and 40. The sprocket wheel 47 is set at a position short of charging the shutter, namely a position where the circular peripheral face 41c between the teeth 41a and 41b is confronted with the photo film 26. It is possible to insert the photo film cassette 22 smoothly without interference between the photo film 26 and the teeth 41a and 41b. The shutter is not charged yet in this state, so that the shutter in the shipment of the lens-fitted film unit is kept from being released even by depression of the shutter release button 14 upon shock in transportation.

A user having purchased the lens-fitted film unit 10 initially rotates the winding wheel 15 manually to stand by for taking an exposure. In this rotation, the photo film 26 is wound into the cassette shell 24. The teeth 41a and 41b of the sprocket wheel 47 have not been engaged with any of the greater and smaller perforations 39 and 40. The sprocket wheel 47 is biased in the driven direction by the plate spring 45. An advancing one of the smaller teeth 41b with reference to the driven direction has remained in contact with the photo film 26, which is fed with slip.

The photo film is further wound. The additional smaller perforation 40a unassociated with the photo film effective portion is moved to the sprocket wheel 47. The advancing one of the smaller teeth 41b of the sprocket wheel 47 is engaged with the additional smaller perforation 40a. Then a first one of the greater perforations 39, associated with the frame 38b and nearer to the trailer 26d, is moved for mesh with a succeeding one of the greater teeth 41a.

At the exposure aperture 236a, the frame 38b to be exposed initially is set.

In the automatic developing/printing apparatus, printing is terminated at the end of printing of frames in the predetermined number. The additional smaller perforation 40a and one of the greater perforations 39 next thereto are not used. The additional smaller perforation 40a specially formed for the lens-fitted film unit does not affect the printing operation.

To render ineffective the additional greater perforation 39a and one of the smaller perforations 40 next thereto after taking all exposures, the above embodiment has the cam projections 55b and 55c under the counter wheel 55. However it is possible to eliminate the cam projection 55c while using the cam projection 55b for operation of rendering two perforations ineffective. After exposure of the frame 38a, the photo film is wound, to cause the sprocket wheel 41 to make half a rotation. The two-toothed gear 56 as rotated causes the counter wheel 55 rotationally to step down as much as one, to indicate a completely exposed status. Upon the stepping of the counter wheel 55, the cam projection 55b comes into the rotational orbit of the top projection 44e of the retainer member 44. The top projection 44e lies between the cam projection 55b, which maintains the retainer member 44 in the disabled position for the inclusion of the photo film.

Figure 20:
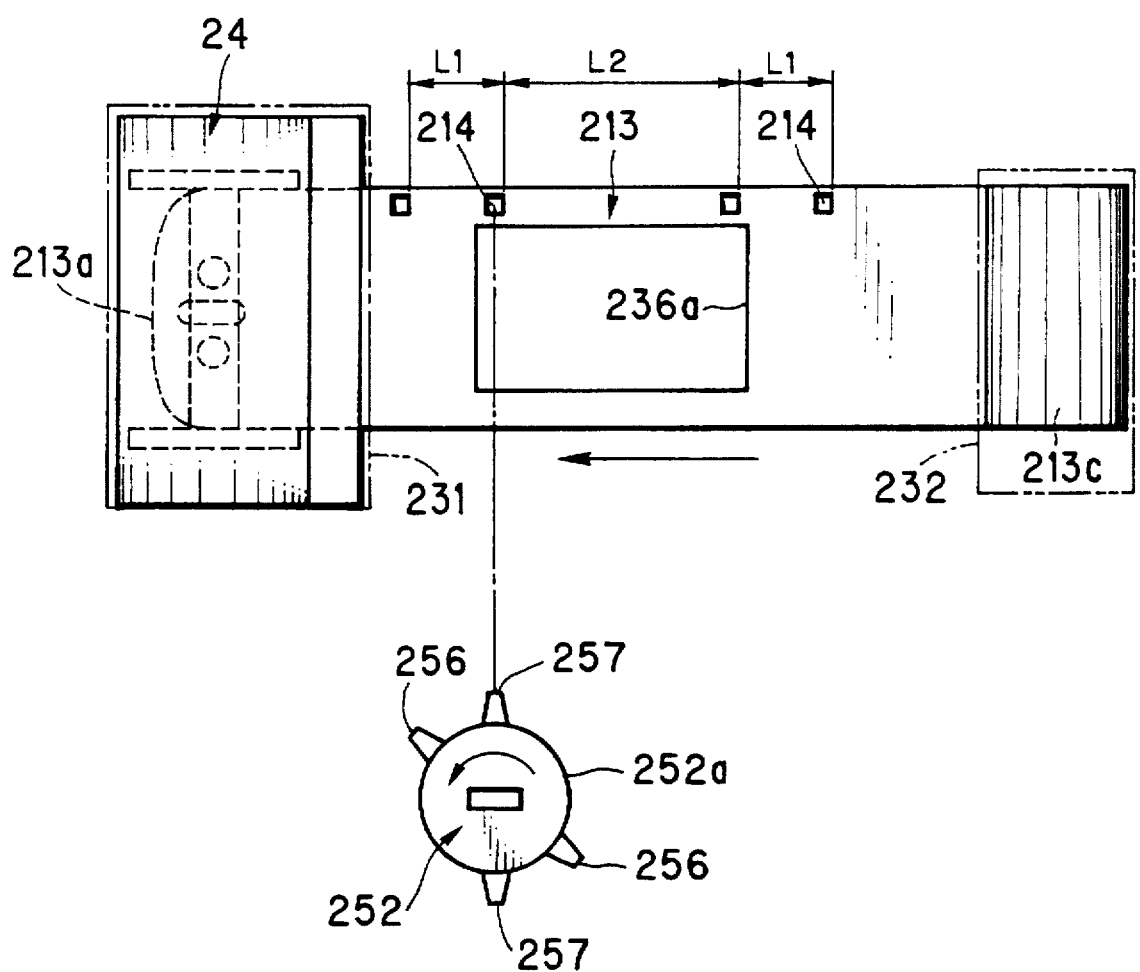
FIG. 20 is an explanatory view illustrating a relationship in position between a sprocket wheel and the photo film.

The invention is applicable to photo film in which two perforations associated with each frame have an equal shape and size, as illustrated in FIGS. 19A, 19B and 20. Perforations 214, 214a, 214b, 216 and 217 have a size equal to the smaller perforations 40 in FIG. 3. A reference numeral 210 designates a photo film cassette, 213 a photo film, 213a a trailer, 213b a leader, 215, 215a and 215b frames, 231 a cassette containing chamber, 232 a photo film roll chamber, 252 a sprocket wheel, 252a a circular peripheral face, and 256 and 257 teeth.

In the control of the frame feeding for the printing, there is no change in a position of an upstream edge of each of the perforations 214 as viewed from the leader toward the trailer, when compared with the photo film 26 in FIG. 3. In other words, only downstream edges of the (2N−1)th ones of the perforations 214 is changed, although there is no change in the upstream edges of the (2N−1)th ones of the perforations 214, the upstream edges of the 2Nth ones of the perforations 214, and downstream edges of the 2Nth ones of the perforations 214. Therefore the photo film 213 is usable in the common automatic developing/printing apparatus with the photo film 26.

The present invention is also applicable to a photo film with perforations having shapes and sizes different from the above embodiments. The perforations can have the shapes and sizes suitable in use for the one-frame feeding in the automatic developing/printing apparatus. It is desirable to, as viewed from the leader toward the trailer, predetermine a position of the upstream edge of the (2N−1)th perforations, a position of the upstream edge of the 2Nth perforations, and a position of a downstream edge of the 2Nth perforations, with reference to each frame. In the one-frame winding mechanism of the above lens-fitted film unit 10, the sprocket wheel makes half a rotation each time of the frame feeding of the photo film, where each frame is associated with two perforations. The present invention is also applicable to a one-frame winding mechanism in which a sprocket wheel makes one rotation each time of the frame feeding of the photo film, where each frame is associated with one perforation. A sprocket wheel for use with such photo film can have two teeth. Although the above rotary member 42 has the cylinder portion 50 including the two projections 50a, the charge cam 51 including the two cam portions 51a, and the stopper cam portion 52 including the two grooves 52a, yet a rotary member for use with the two-tooth sprocket wheel can have a cylinder portion including one projection, a charge cam including one cam portion, and a stopper cam portion including one groove.

In the above embodiments, the sprocket wheel in the photo film unit is located between the cassette and the optical path through the center of the photo film unit. The novel photo film of the present invention can be loaded in a lens-fitted photo film unit in which a sprocket wheel is located between an unexposed roll of the photo film and the optical path.

In the above embodiments, the sprocket wheel with the four teeth is used with the photo film where each frame is associated with two perforations. The present invention, however, is applicable to a combination in which a sprocket wheel with two teeth disposed in rotational symmetry is used with the same photo film where each frame is associated with two perforations.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photo film advancing device for advancing photo film by a regular pitch at which frames are formable on said photo film, a pattern of perforations being formed in said photo film and arranged along at least one edge thereof, said pattern including perforations of which at least one perforation is associated with each of said frames, said photo film advancing device comprising:

a rotatable sprocket wheel having at least one tooth engaged with said one perforation while said photo film is advanced;

a retaining mechanism for causing said sprocket wheel to have a locked state and for disabling said photo film from advancing when said one perforation is engaged with said tooth, said retaining mechanism causing said sprocket wheel to have an unlocked state and enabling said sprocket wheel to rotate when a shutter operates; and a bias member, associated with said sprocket wheel, for operating after said sprocket wheel is rotated a small amount away from said one perforation in a driven direction by advancement of said photo film while said sprocket wheel has said unlocked state, said bias member rotating said sprocket wheel further in said driven direction until said tooth contacts said advancing photo film, said tooth being in standby to engage a second one of said perforations succeeding said one perforation.

2. A photo film advancing device as defined in claim 1, wherein said at least one tooth comprises first and second teeth disposed in rotational positions half a rotation away from one another.

3. A photo film advancing device as defined in claim 2, wherein said shutter is charged while said sprocket wheel makes half a rotation.

4. A photo film advancing device for advancing photo film by a regular pitch at which frames are formable on said photo film, pairs of perforations being formed in said photo film and arranged at said regular pitch along at least one edge thereof, each of said pairs of perforations including first and second perforations arranged at a small regular interval away from one another, said photo film advancing device comprising:

a rotatable sprocket wheel;

at least one pair of teeth disposed on a periphery of said sprocket wheel, each of said at least one pair of teeth including first and second teeth disposed away from one another in association with said regular interval, said first tooth being engaged with said first perforation, and said second tooth being engaged with said second perforation;

a retaining mechanism for causing said sprocket wheel to have a locked state and for disabling said photo film from advancing when said second perforation is engaged with said second tooth, said retaining mechanism causing said sprocket wheel to have an unlocked state and enabling said sprocket wheel to rotate when a shutter operates; and a bias member, associated with said sprocket wheel, for operating after said sprocket wheel is rotated in a driven direction by a small amount by advancement of said photo film while said sprocket wheel has said unlocked state, said bias member rotating said sprocket wheel further by a predetermined amount in said driven direction when said second tooth is moved away from said second perforation, so as to cause said first tooth to stand by for engaging with a succeeding pair of said pairs of perforations with said first tooth in contact with said photo film, and while said first tooth stands by, said photo film being advanced in contact with said first tooth.

5. A photo film advancing device as defined in claim 4, wherein said at least one pair of teeth comprises first and second pairs of teeth disposed in rotational positions half a rotation away from one another.

6. A photo film advancing device as defined in claim 5, wherein the area of said first perforation is less than the area of said second perforation; and said second tooth occupies a greater proportion of said periphery of said sprocket wheel than does said first tooth.

7. A photo film advancing device as defined in claim 5, further comprising:

a frame counter wheel for indicating a number of said formable frames which have been formed;

a rotatable stepping member connected to said sprocket wheel, said stepping member engaging said frame counter wheel, rotated through a predetermined angle, for stepping said frame counter wheel in setting of one of said frames;

said retaining mechanism including a first projection projected toward said frame counter wheel;

a second projection, disposed on said frame counter wheel, moved into a moving path of said first projection upon stepping to a final one of said frames at said frame counter wheel, contacted on said first projection, for retaining said first projection in a disabled position in a middle of said moving path thereof, said disabled position being adapted to allowing advancing a remaining portion of said photo film succeeding said final frame.

8. A photo film advancing device as defined in claim 5, further comprising a cutout, formed in said second tooth, for rendering said second tooth deformable with resiliency toward an inside of said sprocket wheel.

9. A photo film advancing device as defined in claim 8, further comprising a gear box for containing said sprocket wheel in rotatable fashion, said photo film being contacted on said gear box;

said bias member comprising said resiliently deformable second tooth; and a projection, projected from an inside of said gear box, confronted with said second tooth of second pair of teeth by rotation of said sprocket wheel, for rotating said sprocket wheel while said projection is pressed by said second tooth of said second pair of teeth in a rotational orbit thereof, after said second tooth of said first pair of teeth is moved away from said second perforation, and until said first perforation of said succeeding pair of perforations is engaged with said first tooth of said second pair of teeth.

10. A photo film advancing device as defined in claim 5, further comprising:

a shutter drive member, disposed in rotatable fashion in a charge direction toward a charge position and in a release direction toward an initial position in reverse thereto, and when said sprocket wheel is rotated, said shutter drive member being rotated to said charge position, and when said shutter drive member is rotated to said initial position, said shutter drive member driving said shutter;

said bias member adapted to biasing said shutter drive member toward said initial position;

said retaining mechanism being accessible externally, contacted on said shutter drive member, and disposed in rotatable fashion in a charge direction toward a stop position and in a release direction toward an initial position in reverse thereto, and when said shutter drive member is rotated to said charge position, said retaining mechanism being rotated to said stop position, said retaining mechanism being rotated to said initial position by external operation, and when said retaining mechanism is rotated to said initial position, said shutter drive member being rotated to said initial position in abrupt fashion;

a rotatable cam portion, connected to said sprocket wheel, engaged with said shutter drive member when said sprocket wheel rotates, for rotating said shutter drive member toward said charge position;

a first projection projected from said shutter drive member in said release direction;

a cylinder portion, disposed in fashion rotatable integrally with said sprocket wheel;

a pressing lever, disposed beside said shutter drive member in swingable fashion, having a distal end located near to said cylinder portion, and at least one portion located in a rotational orbit of said first projection and pressed by said first projection of said shutter drive member rotated in said release direction; and a second projection projected radially from said cylinder portion, and disposed in a rotational orbit of said distal end of said pressing lever, for pressing and moving past said distal end in rotation of said sprocket wheel, until said second tooth of said first pair of teeth is moved away from said second perforation, said second projection being responsively rotated via said first projection by said distal end biased by said bias member, said sprocket wheel being rotated until said first perforation of said succeeding pair of perforations is engaged with said first tooth of said second pair of teeth.

11. A photo film advancing device as defined in claim 10, wherein said second projection is rotated away from said distal end when said first perforation of said succeeding pair of perforations is engaged with said first tooth of said second pair of teeth, and subsequently said photo film rotates said sprocket wheel, and said sprocket wheel rotates said shutter drive member in said charge direction via said cam portion.

12. A photo film advancing device as defined in claim 11, further comprising a stopper, disposed in a rotational orbit of said shutter drive member in stationary fashion, contacted on said shutter drive member rotated in said release direction, for stopping said shutter drive member in said initial position, said first projection in said initial position being away from said pressing lever;

after said shutter drive member is stopped in said initial position, said sprocket wheel being rotated by said photo film, to press said second projection against said distal end, and said pressing lever being contacted on said first projection.

13. A photo film advancing device as defined in claim 5, further comprising:

a rotatable cylinder portion, connected to said sprocket wheel;

said bias member comprising a plate spring disposed near to said cylinder portion;

a projection, projected radially from said cylinder portion, confronted with said plate spring by rotation of said sprocket wheel, for moving in said driven direction while pressed by said plate spring in a rotational orbit thereof, after said second tooth of said first pair of teeth is moved away from said second perforation, and until said first perforation of said succeeding pair of perforations is engaged with said first tooth of said second pair of teeth.

14. A photo film advancing device as defined in claim 4, wherein said regular interval is zero, to connect said first perforation to said second perforation in a form of a single hole; and said first tooth is integrated with said second tooth in a form of a single claw engageable with said single hole.

15. A lens-fitted photo film unit, pre-loaded with unexposed photo film, and incorporating a driven sprocket wheel and a shutter, said sprocket wheel being engaged with said photo film, and after exposing one of plural frames, said sprocket wheel being rotated through a predetermined angle in advancement of one of said plural frames of said photo film, said shutter being charged when said sprocket wheel is rotated;

said photo film including first to Nth pairs of perforations arranged serially in a longitudinal direction at a regular pitch, one of said plural frames being located between successive two pairs of said first to Nth pairs of perforations, each pair of said first to Nth pairs of perforations including:

a first perforation; and a second perforation formed at a regular interval away from said first perforation, said second perforation's area being greater than said first perforation's area;

said lens-fitted photo film unit comprising:

at least first and second teeth disposed on a periphery of said sprocket wheel, and engaged with said first to Nth pairs of perforations, said second tooth occupying a greater area of said periphery of said sprocket wheel than does said first tooth, said first tooth being engaged with said first perforation, and successively said second tooth being engaged with said second perforation while said photo film is advanced to rotate said sprocket wheel in a driven direction.

16. A lens-fitted photo film unit as defined in claim 15, further comprising a cutout formed in said second tooth.

17. A lens-fitted photo film unit as defined in claim 16, wherein said cutout renders said second tooth deformable with resiliency toward an inside of said sprocket wheel.

18. A lens-fitted photo film unit as defined in claim 17, wherein said second tooth with resiliency has a thickness W3 meeting $$W3<W2-W1$$

where W1 is a size of said first perforation with reference to said longitudinal direction of said photo film, and W2 is a size of said second perforation with reference to said longitudinal direction.

19. A lens-fitted photo film unit as defined in claim 15, further comprising a third tooth disposed on said periphery of said sprocket wheel in rotational symmetry to said first tooth; and a fourth tooth disposed on said periphery of said sprocket wheel in rotational symmetry to said second tooth.

20. A lens-fitted photo film unit as defined in claim 15, further comprising:

a cassette pre-contained therein;

a spool contained in said cassette in rotatable fashion, said photo film having a trailer retained on said spool;

said photo film having a leader previously drawn from said cassette, being wound in a form of a roll, and contained in a side opposite to said cassette;

a winding member, connected to said spool, and operated after exposing one of said plural frames, to wind said photo film into said cassette as much as each of said plural frames;

said first to Nth pairs of perforations being arranged from said trailer toward said leader, N being one more than a number of said plural frames photographable to photo film;

said sprocket wheel being disposed near to said cassette, and when one pair of said first to (N−1)th pairs of perforations is engaged with said sprocket wheel, one of said plural frames of said photo film being set;

a retaining mechanism for causing said sprocket wheel to have a locked state and for disabling said photo film from advancing when said one pair of perforations is engaged with said sprocket wheel, said retaining mechanism causing said sprocket wheel to have an unlocked state and enabling said sprocket wheel to rotate when said shutter is released; and a disabling device for keeping said retaining mechanism operating for said unlocked state when said Nth pair of perforations is engaged with said sprocket wheel, to disable said photo film from being exposed after exposing an (N−1)th one of said plural frames.

21. A lens-fitted photo film unit, in which a photo film housing is pre-loaded with unexposed photo film and pre-contains a cassette, said photo film housing has a photograph-taking device including a taking lens, a shutter and a winding member, said cassette has a rotatable spool, said photo film has a trailer retained on said spool, and a leader previously drawn from said cassette, and wound in a form of a roll, and said winding member is connected to said spool, and operated after exposing each of first to Nth frames, to wind said photo film into said cassette by one of said frames;

said photo film including:

first to Nth pairs of perforations arranged serially from said leader toward said trailer at a regular pitch, one of said first to Nth frames being located between successive two pairs of said first to Nth pairs of perforations, each pair of said first to Nth pairs of perforations including:

a first perforation; and a second perforation formed at a regular interval away from said first perforation toward said trailer, said first and second perforations being associated with an edge of each of said frames nearer to said leader;

said photo film further including:

an (N+1)th pair of perforations formed at said regular pitch away from said Nth pair of perforations toward said trailer, said (N+1)th pair of perforations including two perforations arranged at said regular interval away from one another, said (N+1)th pair of perforations being associated with an edge of said Nth frame nearer to said trailer;

said lens-fitted photo film unit comprising:

a driven sprocket wheel, disposed between said taking lens and said cassette, engaged with said photo film advanced from said trailer toward said leader, rotated through a predetermined angle in advancement of one of said frames of said photo film, one of said frames being set when one pair of said (N+1)th to second pairs of perforations is engaged with said sprocket wheel;

a retaining mechanism for causing said sprocket wheel to have a locked state and for disabling said photo film from advancing when said one pair of perforations is engaged with said sprocket wheel, said retaining mechanism causing said sprocket wheel to have an unlocked state and enabling said sprocket wheel to rotate when said shutter is released; and a disabling device for keeping said retaining mechanism operating for said unlocked state when said first pair of perforations is engaged with said sprocket wheel, to disable said photo film from being exposed after exposing said first frame.

22. A lens-fitted photo film unit as defined in claim 21, further comprising:

a frame counter mechanism for indicating a number of at least one exposed frame of said frames;

a rotatable stepping member connected to said sprocket wheel, connected to said frame counter mechanism, rotated as much as said predetermined angle, for stepping said frame counter mechanism in setting of one of said frames;

said retaining mechanism including a first projection projected toward said frame counter mechanism;

said disabling device comprising a second projection disposed on said frame counter mechanism, moved into a moving path of said first projection upon stepping from said second frame to said first frame at said frame counter mechanism, contacted on said first projection, for retaining said first projection in a disabled position in a middle of said moving path thereof, said disabled position being adapted to including said photo film into said cassette.

23. A lens-fitted photo film unit as defined in claim 22, wherein said frame counter mechanism comprises a rotatable counter wheel having teeth disposed on a periphery thereof and in a number more than N;

said sprocket wheel has four teeth disposed on a periphery thereof and makes half a rotation in advancement of one of said frames of said photo film;

said stepping member comprises a two-toothed gear, which is engaged with said teeth of said counter wheel, and makes half a rotation, to rotate said counter wheel as much as one of said teeth thereof.

24. A lens-fitted photo film unit as defined in claim 23, further comprising a shutter drive member, disposed in rotatable fashion in a charge direction toward a charge position and in a release direction toward an initial position in reverse thereto, and when said sprocket wheel is rotated, said shutter drive member being rotated to said charge position, and when said shutter drive member is rotated to said initial position, said shutter drive member driving said shutter;

said retaining mechanism being accessible externally, contacted on said shutter drive member, and disposed in rotatable fashion in a charge direction toward a stop position and in a release direction toward an initial position in reverse thereto, and when said shutter drive member is rotated to said charge position, said retaining mechanism being rotated to said stop position, said retaining mechanism being rotated to said initial position by external operation, and when said retaining mechanism is rotated to said initial position, said shutter drive member being rotated to said initial position in abrupt fashion;

said disabled position of said first projection being located between said stop position and said initial position.

25. A lens-fitted photo film unit as defined in claim 24, further comprising a first cam portion disposed in fashion rotatable integrally with said sprocket wheel;

said retaining mechanism including:

a first claw, projected radially, for retaining said first cam portion when rotated in said stop position, to disable said sprocket wheel from rotating;

a second claw, projected radially, for retaining said winding member when rotated in said stop position, to disable said photo film from being advanced by external operation; and a first ridge projected toward said shutter drive member;

said shutter drive member including:

a second ridge, projected toward said retaining mechanism, for retaining said first ridge in said initial position when having said initial position;

wherein said second ridge when having said charge position releases said first ridge from retention in said initial position;

said first ridge when rotated to said stop position retains said second ridge in said charge position; and said first ridge when rotated in said initial position releases said second ridge from retention in said charge position.

26. A lens-fitted photo film unit as defined in claim 25, wherein said first claw is moved away from said first cam portion when said second projection is contacted on said first projection, to cause said sprocket wheel to have said unlocked state;

said second claw is moved away from said winding member when said second projection is contacted on said first projection, to release said winding member from retention, to enable said photo film to be wound by external operation;

said first ridge is kept in said disabled position when said second projection is contacted on said first projection, to keep said second ridge in said charge position.

27. A lens-fitted photo film unit as defined in claim 26, further comprising:

a bias member for biasing said retaining mechanism toward said stop position and for biasing said shutter drive member toward said initial position, said retaining mechanism being rotated by external operation against said bias member toward said initial position;

a second cam portion disposed in fashion rotatable integrally with said sprocket wheel;

said shutter drive member including:

a third claw, projected radially, engaged with said second cam portion, and rotated toward said charge position when said sprocket wheel rotates;

a first arm extended radially toward said shutter;

a shutter blade portion; and a second arm, extended radially, and stricken by said first arm when rotated abruptly to said initial position, said shutter blade portion effecting opening/closing operation.

28. A lens-fitted photo film unit as defined in claim 21, wherein said first perforation has an area treater than that of said second perforation; and said sprocket wheel includes at least first and second teeth disposed on a periphery of said sprocket wheel, and engaged with said first to Nth pairs of perforations, said second tooth being greater than said first tooth, said first tooth being engaged with said first perforation, and successively said second tooth being engaged with said second perforation while said photo film is advanced to rotate said sprocket wheel in a driven direction.

* * * * *